US012561759B2

(12) United States Patent
     Gwak et al.

(10) Patent No.: US 12,561,759 B2
(45) Date of Patent: Feb. 24, 2026

(54) METHOD FOR GENERATE TRAINING DATA FOR TRANSPORTATION FACILITY AND COMPUTER PROGRAM RECORDED ON RECORD-MEDIUM FOR EXECUTING METHOD THEREFOR

(71) Applicant: MOBILTECH, Seoul (KR)

(72) Inventors: Yong Jae Gwak, Seoul (KR); Jae Seung Kim, Seoul (KR)

(73) Assignee: MOBILTECH, Seoul (KR)

( * ) Notice: Subject to any disclaimer, the term of this patent is extended or adjusted under 35 U.S.C. 154(b) by 406 days.

(21) Appl. No.: 18/339,354

(22) Filed: Jun. 22, 2023

(65) Prior Publication Data

US 2024/0144435 A1 May 2, 2024

(30) Foreign Application Priority Data

Oct. 27, 2022 (KR) ........................ 10-2022-0139935

(51) Int. Cl.
*G06V 10/774* (2022.01)
*G06T 3/60* (2006.01)
*G06T 5/50* (2006.01)
*G06T 5/70* (2024.01)
*G08G 1/017* (2006.01)

(52) U.S. Cl.
CPC .................. *G06T 5/50* (2013.01); *G06T 3/60* (2013.01); *G06T 5/70* (2024.01); *G08G 1/0175* (2013.01)

(58) Field of Classification Search
CPC .... G06T 5/50; G06T 3/60; G06T 5/70; G08G 1/0104; G08G 1/0112; G06N 3/08; G06V 10/774; G06V 10/764; G06V 10/82; G06V 20/582
See application file for complete search history.

(56) References Cited

U.S. PATENT DOCUMENTS

| | | | | |
|---|---|---|---|---|
| 2019/0289273 | A1* | 9/2019 | Mabuchi | ................ G06V 20/56 |
| 2023/0177845 | A1* | 6/2023 | Lee | ........................ G06V 20/70 |
| | | | | 382/103 |
| 2024/0112448 | A1* | 4/2024 | Arief | ...................... G06T 11/00 |

FOREIGN PATENT DOCUMENTS

| | | | |
|---|---|---|---|
| KR | 10-2013-0123041 A | 11/2013 |
| KR | 10-2019-0054782 A | 5/2019 |
| KR | 10-2019-0115542 A | 10/2019 |

* cited by examiner

*Primary Examiner* — Kent Yip
(74) *Attorney, Agent, or Firm* — Bridgeway IP Law Group, PLLC; Jihun Kim

(57) ABSTRACT

Proposed is a method of generating learning data for traffic facilities, which can facilitate recognition of traffic facilities. The method includes the steps of: collecting, by a learning data generation unit, traffic facility sample images; generating, by the learning data generation unit, at least one processed image by processing the collected traffic facility sample images to be recognized as images captured by a camera installed in a vehicle; and generating, by the learning data generation unit, learning data by inserting a background into the generated at least one processed image.

8 Claims, 24 Drawing Sheets

250 — Processor

255 — Memory
280a — Software

Transceiver
260

270

BUS

265 — Input/output device

275 — Storage
280b — Software
285 — Database

200

(A)                                    (B)

(A)                                    (B)

Standard area (A)                  (B)

(A)                    (B)

Standard area (A) (B)

noise (A)

(B)

(A)

(B)

(A)

(B)

(A)

(B)

(A)

(B)

(A)

(B)

METHOD FOR GENERATE TRAINING DATA FOR TRANSPORTATION FACILITY AND COMPUTER PROGRAM RECORDED ON RECORD-MEDIUM FOR EXECUTING METHOD THEREFOR

BACKGROUND OF THE INVENTION

Field of the Invention

The present invention relates to a precise road map, and more specifically, to a method of generating learning data for traffic facilities, which can facilitate recognition of traffic facilities existing on the road, and a computer program recorded on a recording medium to execute the same.

Background of the Related Art

Autonomous driving of a vehicle means a system of a vehicle that can operate based on its own decision. The autonomous driving may be classified into progressive levels from non-automation to full-automation according to a degree of involvement of the system in driving and a degree of the driver in controlling the vehicle. Generally, the level of autonomous driving is divided into six levels classified by the Society of Automotive Engineers (SAE) International. According to the six levels classified by the Society of Automotive Engineers (SAE) International, level 0 is non-automation, level 1 is driver assistance, level 2 is partial automation, level 3 is conditional automation, level 4 is high-level automation, and level 5 is full automation.

Autonomous driving of a vehicle is performed through a mechanism of perception, localization, path planning, and control. In addition, various companies are developing to implement the perception and the path planning in the autonomous driving mechanism using artificial intelligence (AI).

For the autonomous driving like this, various information on roads should be preemptively collected. However, it is not easy in reality to collect and analyze a large amount of information in real time using only vehicle sensors. Accordingly, in order to realize autonomous driving, a precise road map that can provide various information actually needed for autonomous driving is essential.

Here, the precise road map refers to a three-dimensional electronic map constructed with information on the roads and surrounding topography at an accuracy of ±25 cm. The precise road map like this is a map including precise information such as road width, road curvature, road slope, lane information (dotted lines, solid lines, stop lines, etc.), surface type information (crosswalks, speed bumps, shoulders, etc.), road surface mark information, road sign information, and facility information (traffic lights, curbs, manholes, etc.), in addition to information on general electronic maps (node information and link information needed for route guidance).

In order to create such a precise road map, various related data such as a Mobile Mapping System (MMS), aerial photographing information, and the like are required.

In particular, the MMS is mounted on a vehicle to measure positions of landmarks in the vicinity of a road and acquire visual information while the vehicle is driving. That is, the MMS may be generated based on information collected by Global Positioning System (GPS), Inertial Navigation System (INS), and Inertial Measurement Unit (IMU) for acquiring position and posture information of the vehicle body, and a camera, a Light Detection and Ranging (LiDAR) sensor, and other sensors for collecting shapes and information on landmarks.

The precise road map manufactured using the MMS includes various traffic facilities such as various road signs, traffic lights, and the like. Accordingly, in order to effectively use the precise road map, direction information for the traffic facilities is required.

Although algorithms for generating direction information using point cloud data obtained from a LiDAR are developed recently, as the structure is very complicated, the usability is poor.

In addition, in order to generate learning data about traffic facilities included in the precise road map, a good many of images including traffic facilities are required. However, it is difficult to secure data since there is no publicized data sets related to images including traffic facilities and the quantity of images including traffic facilities is limited.

On the other hand, when 3D modeling is performed using an aviation LiDAR, since point cloud data acquired from a LiDAR located on the upper part of an object is collected, density of the collected point cloud decreases toward the lower part of the object. Accordingly, since existing modeling techniques perform modeling on all collected point clouds at the same time, noise is generated due to the difference in the density of the point clouds, and as a result, there is a problem in that accuracy of the modeled object is lowered.

Meanwhile, it is general that point cloud data accumulated in units of a specific distance is projected onto one sheet of image in order to generate a color map by assigning the color of an image captured by a camera to the point cloud data acquired from a LiDAR. Accordingly, although the generated color map is expressed as being hidden by a specific object on the image, there is a problem in that a noise of applying a wrong color of the image to the recognized area is generated on the point cloud data.

In addition, the generated color map has a problem in that a noise of applying a bright color to an object having a specific dark color is generated due to the color of the sky or reflection of light.

The present invention relates to a technique developed through the 'Urban change detection platform using mobility service' of Seoul Business Agency (2022 Seoul Innovation Challenge (final contest)) (IC210027).

In addition, the present invention is a technique developed through 'Task No. 22AMDP-C160637-02' of Korea Agency for Infrastructure Technology Advancement under the Ministry of Land, Infrastructure and Transport.

(Patent Document 0001) Korean Patent Publication No. 10-2013-0123041, 'Indoor map automatic generation method using LiDAR device', (published on Nov. 12, 2013)

SUMMARY OF THE INVENTION

Therefore, the present invention has been made in view of the above problems, and it is an object of the present invention to provide a method of generating learning data for traffic facilities, which can facilitate recognition of traffic facilities existing on the road.

Another object of the present invention to provide a computer program recorded on a recording medium to execute a method of generating learning data for traffic facilities, which can facilitate recognition of traffic facilities existing on the road.

The technical problems of the present invention are not limited to the technical problems mentioned above, and unmentioned other technical problems will be clearly understood by those skilled in the art from the following description.

To accomplish the above objects, the present invention proposes a method of generating learning data for traffic facilities, which can facilitate recognition of traffic facilities. The method comprises the steps of: collecting, by a learning data generation unit, traffic facility sample images; generating, by the learning data generation unit, at least one processed image by processing the collected traffic facility sample images to be recognized as images captured by a camera installed in a vehicle; and generating, by the learning data generation unit, learning data by inserting a background into the generated at least one processed image.

Specifically, the step of generating at least one processed image includes generating a plurality of first processed images by applying shearing to the collected traffic facility sample images within a specific angular range.

The step of generating at least one processed image includes applying shearing to the collected traffic facility sample images with a random value between −10 and 10°.

The step of generating at least one processed image includes generating a second processed image by applying Gaussian blur to the first processed image.

The step of generating at least one processed image includes randomly applying Gaussian blur to the first processed image within a radius value for a preset pixel.

The step of generating at least one processed image includes generating a plurality of third processed images by applying an intensity value to the second processed image.

The step of generating at least one processed image includes randomly applying an intensity value to the second processed image within a preset range of intensity value.

The step of generating at least one processed image includes selectively applying an intensity value to a specific area of the second processed image.

At the step of generating learning data, the background is a random area on a plurality of 2D images collected through the camera mounted on the vehicle.

The step of generating learning data includes generating the learning data by randomly applying a size of the processed image to the background.

The step of generating learning data includes generating the learning data by randomly applying a location of the processed image to the background.

At the step of collecting traffic facility sample images, the traffic facility sample image is a front view of a traffic facility.

To accomplish the above objects, the present invention proposes a computer program recorded on a recording medium to execute a method of generating learning data for traffic facilities, which can facilitate recognition of traffic facilities. The computer program may be combined with a computing device including a memory, a transceiver, and a processor for processing instructions loaded on the memory. In addition, the computer program may be a computer program recorded on a recording medium to execute the steps of: collecting, by the processor, traffic facility sample images stored in advance; generating, by the processor, at least one processed image by processing the collected traffic facility sample images to be recognized as images captured by a camera installed in a vehicle; and generating, by the processor, learning data by inserting a background into the generated at least one processed image.

Details of other embodiments are included in the detailed description and drawings.

According to the embodiments of the present invention, as traffic facility sample images are processed to be recognized as images actually captured by a camera, and learning data is generated by inserting a background into the processed images, sufficient learning data can be secured for traffic facilities with limited amounts of images.

The effects of the present invention are not limited to the effects mentioned above, and unmentioned other effects will be clearly understood by those skilled in the art from the following description.

DETAILED DESCRIPTION OF THE PREFERRED EMBODIMENT

Figure 1:
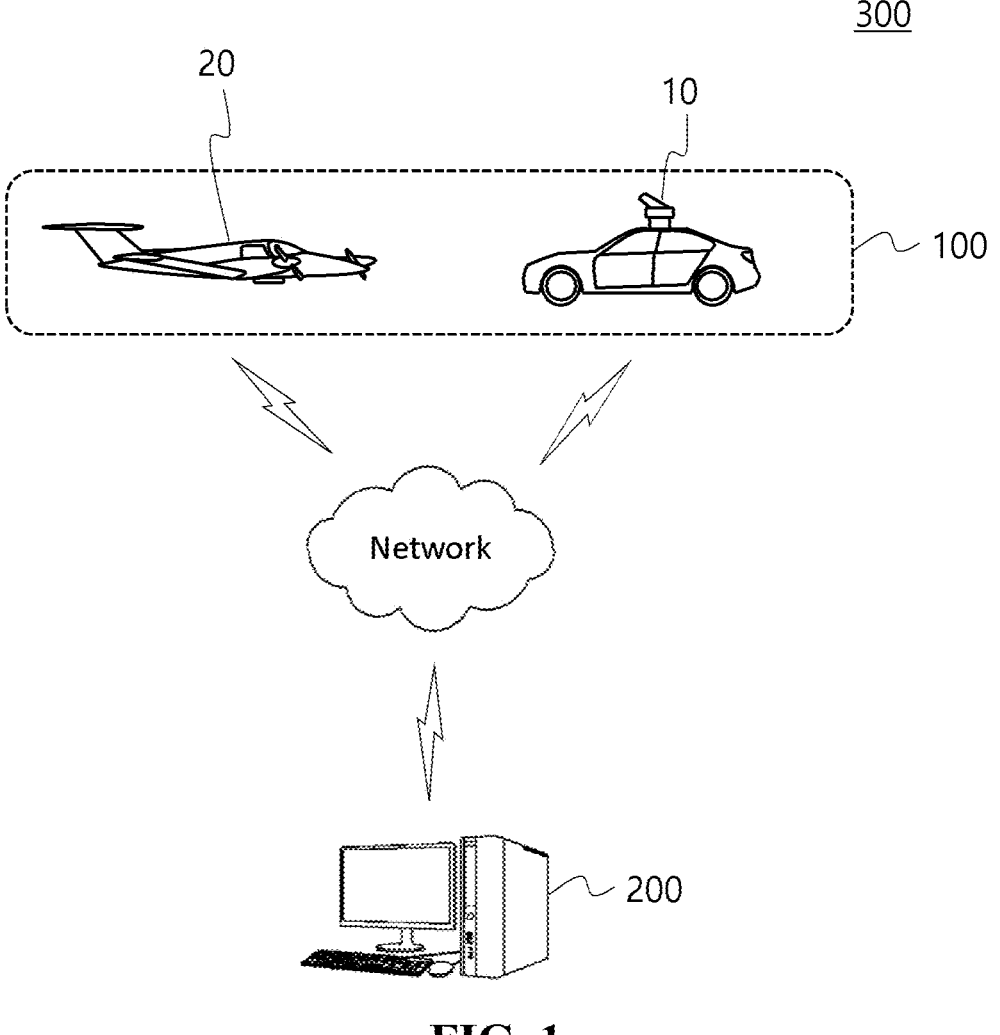
FIG. 1 is a view showing the configuration of a data generation system according to an embodiment of the present invention.

It should be noted that the technical terms used in this specification are only used to describe specific embodiments and are not intended to limit the present invention. In addition, the technical terms used in this specification should be interpreted as a meaning commonly understood by those of skilled in the art, unless specifically defined otherwise in this specification, and should not be interpreted in an excessively inclusive or reduced meaning. In addition, when the technical terms used in this specification are incorrect technical terms that do not accurately express the spirit of the present invention, they should be replaced with technical terms that those skilled in the art can correctly understand. In addition, general terms used in the present invention should be interpreted as defined in a dictionary or according to the context, and should not be interpreted in an excessively reduced meaning.

In addition, singular expressions used in this specification include plural expressions unless the context clearly indicates otherwise. In this application, terms such as 'configured of' or 'having' should not be interpreted as necessarily including all of the various components or steps described in the specification, and should be interpreted as including some of the components or steps among them, or further including additional components or steps.

In addition, although the terms including ordinal numbers such as first, second, and the like used in this specification may be used to describe various components, the components should not be limited by the terms. The terms are used only for the purpose of distinguishing one component from another. For example, a first component may be named as a second component without departing from the scope of the present invention, and similarly, a second component may also be named as a first component.

When a component is referred to as being 'connected' or 'coupled' to another component, although it may be directly connected or coupled to another component, other components may exist between the components. On the contrary, when a component is referred to as being 'directly connected' or 'directly coupled' to another component, it should be understood that no other component exists therebetween.

Hereinafter, preferred embodiments according to the present invention will be described in detail with reference to the accompanying drawings, and the same or similar components are given the same reference numerals regardless of drawing symbols, and redundant description thereof will be omitted. In addition, when it is determined in describing the present invention that a detailed description of a related known technology may obscure the gist of the present invention, the detailed description will be omitted. In addition, it should be noted that the accompanying drawings are only for easy understanding of the spirit of the present invention, and it should not be construed as limiting the spirit of the present invention by the accompanying drawings. The spirit of the present invention should be interpreted as extending to all changes, equivalents, and substitutes, in addition to the accompanying drawings.

Meanwhile, the precise road map manufactured using the MMS includes various traffic facilities such as various road signs, traffic lights, and the like. Accordingly, in order to effectively use the precise road map, direction information for the traffic facilities is required.

Although algorithms for generating direction information using point cloud data obtained from a LiDAR are developed recently, as the structure is very complicated, the usability is poor.

In addition, in order to generate learning data about traffic facilities included in the precise road map, a good many of images including traffic facilities are required. However, it is difficult to secure data since there is no publicized data sets related to images including traffic facilities and the quantity of images including traffic facilities is limited.

On the other hand, when 3D modeling is performed using an aviation LiDAR, since point cloud data acquired from a LiDAR located on the upper part of an object is collected, density of the collected point cloud decreases toward the lower part of the object. Accordingly, since existing modeling techniques perform modeling on all collected point clouds at the same time, noise is generated due to the difference in the density of the point clouds, and as a result, there is a problem in that accuracy of the modeled object is lowered.

Meanwhile, it is general that point cloud data accumulated in units of a specific distance is projected onto one sheet of image in order to generate a color map by assigning the color of an image captured by a camera to the point cloud data acquired from a LiDAR. Accordingly, although the generated color map is expressed as being hidden by a specific object on the image, there is a problem in that a noise of applying a wrong color of the image to the recognized area is generated on the point cloud data.

In addition, the generated color map has a problem in that a noise of applying a bright color to an object having a specific dark color is generated due to the color of the sky or reflection of light.

To overcome these limitations, the present invention proposes various means capable of generating a map including direction information for traffic facilities existing on the road, facilitating recognition of the traffic facilities existing on the road, efficiently generating a 3D map by using point cloud data acquired from a LiDAR installed in an aviation device, and generating a color map by assigning the color of the image captured by the camera to the point cloud data acquired from the LiDAR.

FIG. 1 is a view showing the configuration of a data generation system according to an embodiment of the present invention.

As shown in FIG. 1, a data generation system 300 according to an embodiment of the present invention may include a data collection device 100 and a data generation device 200.

Since the components of the data generation system according to an embodiment are only functionally distinguished components, two or more components may be implemented to be integrated in an actual physical environment, or one component may be implemented to be separated in an actual physical environment.

Describing each component, the data generation system 100 may collect data needed for generating a map and learning data.

The data generation system 100 may be configured to include one or more among a LiDAR, a camera, a radar, an ultrasonic sensor, an encoder, a temperature sensor, and a humidity sensor. However, it is not limited thereto, and sensors capable of sensing various information may be applied to generate a precise road map.

Particularly, the data collection device 100 according to an embodiment of the present invention may be configured to include a LiDAR and a camera, and may collect point cloud data acquired by the LiDAR and images captured by the camera.

Here, the LiDAR 210 may emit laser pulses around a vehicle 10 or an aviation device 20, detect light reflected and returned from objects located around the vehicle, and generate point cloud data corresponding to a three-dimensional image of around the vehicle.

The camera may acquire images of a space collected from the LiDAR around the LiDAR. The camera may include any one among a color camera, a near infrared (NIR) camera, a short wavelength infrared (SWIR) camera, and a long wave length infrared (LWIR) camera.

The data collection device 100 may be installed in the vehicle 10 or the aviation device 20. For example, the data collection device 100 may be installed on the upper part of the vehicle 10 to collect point cloud data or images of the surroundings, or may be installed on the lower part of the aviation device 20 to collect point cloud data or images of objects on the ground from the air.

As a next configuration, the data generation device 200 may receive the point cloud data acquired by the LiDAR and the images captured by the camera from the data collection device 100.

The data generation device 200 may generate a precise road map using the received point cloud data and a camera, and may generate learning data using the precise road map.

Characteristically, according to an embodiment of the present invention, the data generation device 200 may receive at least one image captured by at least one camera fixedly installed in the vehicle 10, detect traffic facilities from the received at least one image, generate direction information on the basis of the point cloud data acquired by the LiDAR for the detected traffic facilities, and generate a map including the generated direction information.

According to another embodiment of the present invention, the data generation device 200 may collect traffic facility sample images, generate at least one processed image by processing the collected traffic facility sample images to be recognized as images captured by a camera installed in the vehicle, and generate learning data by inserting a background into the generated at least one processed image.

In addition, according to another embodiment of the present invention, the data generation device 200 may receive the point cloud data acquired from the LiDAR installed in the aviation device 20, project a top-view of the received point cloud data, and generate a map of an object by scanning the projected point cloud data in a direction perpendicular to the ground.

In addition, according to another embodiment of the present invention, the data generation device 200 may receive an image captured by the camera and point cloud data acquired from the LiDAR, project the received point cloud data onto the image, filter the point cloud data projected onto the image based on the distance, and generate a color map by assigning the color of the image to the filtered point cloud data.

In addition, according to still another embodiment of the present invention, the data generation device 200 may assign the color of the image captured through the camera to the point cloud data acquired from the LiDAR, separate points having a preset color from the colored point cloud data, and generate a color map by correcting colors of the separated points based on the colors of neighboring points.

Meanwhile, although various embodiments of the present invention have been described as being separated from each other to perform their own functions, the present invention is not limited thereto, and the functions may be applied in combination with each other.

The data collection device 100 and the data generation device 200 as described above may transmit and receive data using a network combining one or more among a security circuit, a public wired communication network, and a mobile communication network directly connecting the devices.

For example, the public wired communication network may include Ethernet, x Digital Subscriber Line (xDSL), Hybrid Fiber Coax (HFC), and Fiber-To-The-Home (FTTH), but is not limited thereto. In addition, the mobile communication network may include Code Division Multiple Access (CDMA), Wideband CDMA (WCDMA), High Speed Packet Access (HSPA), Long Term Evolution (LTE), and 5th generation mobile telecommunication, but is not limited thereto.

Hereinafter, the data generation device 200 as described above will be described in detail.

Figure 2:
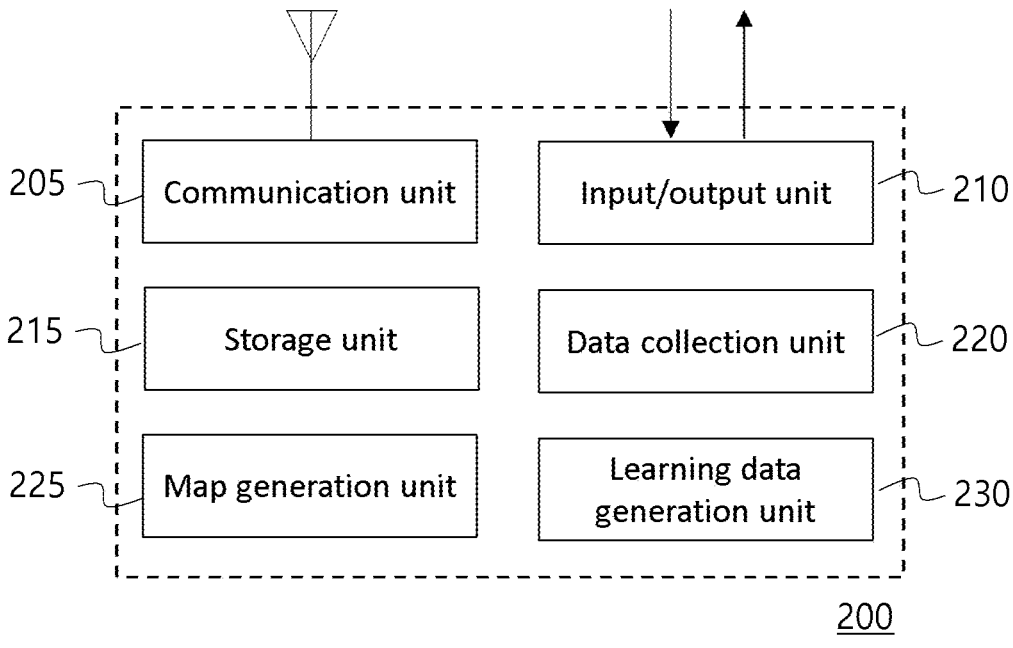
FIG. 2 is a block diagram showing the logical configuration of a data generation device according to an embodiment of the present invention.

FIG. 2 is a block diagram showing the logical configuration of a data generation device according to an embodiment of the present invention.

Referring to FIG. 2, the data generation device 200 according to an embodiment of the present invention may be configured to include a communication unit 205, an input/output unit 210, a storage unit 215, a data collection unit 220, and a map generation unit 225, and a learning data generation unit 230.

Since the components of data generation device 200 are only functionally distinguished components, two or more components may be implemented to be integrated in an actual physical environment, or one component may be implemented to be separated in an actual physical environment.

Describing each component, the communication unit 205 may transmit and receive data to and from the data collection device 100. Specifically, the communication unit 205 may receive point cloud data acquired by the LiDAR and images captured through the camera from the data collection device 100.

As a next configuration, the input/output unit 210 may receive a signal from a user through a user interface (UI) or output an operation result to the outside. Specifically, the input/output unit 210 may receive a set value for generating direction information, a set value for generating learning data, a set value for generating a map, or the like, or may output a generated map, learning data, or the like.

As a next configuration, the storage unit 215 may store the point cloud data or images received from the data collection device 100, the generated map or learning data, and the like. Specifically, the storage unit 215 may store an algorithm for generating direction information, an algorithm for generating learning data, an algorithm for generating a map, and the like.

As a next configuration, the data collection unit 220 may control to collect the point cloud data acquired by the LiDAR and the images captured by the camera from the data collection device 100 through the communication unit 205. Specifically, the data collection unit 220 may control to receive continuously acquired point cloud data from the LiDAR and images captured at preset intervals from the camera.

As a next configuration, the map generation unit 225 may generate direction information for the traffic facilities detected on the image on the basis of the point cloud data, so that the precise road map may be effectively used through the generated direction information.

Specifically, the map generation unit 225 may detect traffic facilities from a 2D image using a deep learning-based object detection algorithm. Here, the map generation unit 225 may generate direction information when the detected traffic facility is located within a preset distance or when the number of point clouds included in the detected traffic facility is greater than or equal to a preset value. In addition, the map generation unit 225 may generate direction information when the ratio between the horizontal width and the vertical width of the bounding box of the detected traffic facility is equal to or smaller than a preset value. That is, in order to extract an accurate direction of the traffic facility, the map generation unit 225 may determine direction information only when the traffic facility enters within a predetermined distance or when the bounding box of the detected traffic facility is not imbalanced and the number of point clouds included in the detected traffic facility is greater than or equal to a predetermined number.

At this point, the map generation unit 225 may detect traffic facilities from the 2D image using distance-based Euclidean clustering. That is, when point cloud data for generating direction information is extracted, the map generation unit 225 may configure clusters for the traffic facilities through the Euclidean clustering algorithm in order to prevent extraction of point cloud data of objects other than the detected traffic facility.

In addition, the map generation unit 225 may perform down sampling by filtering the point clouds included in the detected traffic facility in the form of a voxel grid. That is, the map generation unit 225 may down-sample imbalanced point clouds among the point clouds included in the detected traffic facility in a balanced form.

In addition, the map generation unit 225 may accumulate point cloud data for the detected traffic facilities, and generate direction information when a preset value is satisfied. That is, the map generation unit 225 may generate direction information while it secures sufficient point clouds for traffic facilities by accumulating the point clouds. For example, the map generation unit 225 may generate direction information after accumulating point cloud data for the detected traffic facilities as much as a predetermined number of rotations of the LiDAR.

In addition, the map generation unit 225 may acquire a representative plane by randomly searching for point clouds for the detected traffic facilities using a Random Sample Consensus (RANSAC) algorithm. That is, the map generation unit 225 may randomly select three points from the point cloud for the detected traffic facilities, and obtain a plane passing through the selected three points. At this point, inlier points having a distance to the plane smaller than a preset value may be identified, and the number of inlier points may be obtained. At this point, the map generation unit 225 may select a plane having the largest number of inlier points as the representative plane.

In addition, the map generation unit 225 may calculate a normal vector that extends vertically from the plane using a plane equation on the basis of the representative plane. That is, the map generation unit 225 may obtain direction information with respect to the representative plane through the plane equation described in the following equation.

$$Ax+By+Cz+D=0 \qquad \text{[Equation 1]}$$

(Here, (A, B, C) is the normal vector with respect to the representative plane, D is the length of the normal vector, and (x, y, z) may be an arbitrary point on the representative plane.)

In addition, the map generation unit 225 may generate a map including direction information for the generated traffic facility. At this point, the map generation unit 225 may display the generated normal vector on the map or include the normal vector in the meta information of the map.

For example, the map including direction information may selectively provide information to drivers who need information on traffic facilities pointing a specific direction, or support managers, who manage the traffic facilities, to determine that maintenance is required when the direction of a traffic facility is changed in comparison with the initially installed direction.

Meanwhile, conventional modeling techniques perform modeling by scanning all point cloud data at once. However, since point cloud data collected from a LiDAR installed in an aviation device has a lower density of point clouds toward the lower part of an object due to the nature, the conventional modeling techniques are inadequate for generating a map.

Accordingly, the map generation unit 225 may enhance accuracy of 3D modeling by projecting the top-view of the point cloud data acquired from the LiDAR installed in the aviation device, and recognizing and scanning the edge of an object in a direction perpendicular to the ground.

Specifically, the map generation unit 225 may detect a reference area of the projected point cloud data, and detect an edge of an object while scanning the reference area in a direction perpendicular to the ground. Here, the reference area may be the edge of the lowermost surface of the object included in the point cloud data. That is, the map generation unit 225 may detect the reference area, which is the lowermost surface of the object, and detect the edge of an object while scanning in the upper direction of the object from the reference area.

To this end, the map generation unit 225 may extract a closed curve from the point cloud located within a preset distance among the scanned point cloud data, and detect the closed curve as the edge of the object. For example, the map generation unit 225 may detect an edge of an object based on an alpha shape algorithm. That is, the map generation unit 225 may form an edge of an object surrounded by a plurality of circles by drawing a circle having a radius of 'a' connecting contours of two points randomly selected from the point cloud located within a preset distance among the scanned point cloud data.

In addition, when there is a difference between the reference area and the area of the detected edge as much as a preset value or more, the map generation unit 225 may detect edges detected from the reference area before the edge where the difference has occurred.

In addition, the map generation unit 225 may model an area from the reference area to an edge detected before the edge where the difference has occurred. At this point, the map generation unit 225 may update the area from the previous reference area to the edge where the difference has occurred as a new reference area.

Here, the map generation unit 225 may model an object by connecting the point cloud included in an area from the reference area to the edge detected before the edge where the difference has occurred in a triangular shape to maximize the minimum value of the interior angle of the triangle. That is, the map generation unit 225 may model the object through Delaunay triangulation. In other words, the map generation unit 225 may configure a super triangle including all the point cloud of the detected edge, and when no other points exist in a circle containing the three points in the super triangle, the triangle may be added as a Delaunay triangle for each point cloud. At this point, the super triangle may be deleted after the process of constructing a Delaunay triangular network is completed. Then, the map generation unit 225 may form an external surface by meshing the modeled object.

In addition, for an object having an upper area larger than a lower area, the map generation unit 225 may model the object by setting the uppermost edge of the object as the reference area and scanning toward the lower part of the object from the reference area.

In addition, the map generation unit 225 may effectively remove noise applied with a wrong color of the image from an area recognized on the point cloud data although it is expressed as being hidden by a specific object on the image by projecting the point cloud data on the image, filtering the point cloud data projected on the image based on the distance, and generating a color map.

Specifically, the map generation unit 225 may generate unit point cloud data by grouping the point cloud data on the basis of the movement distance of the LiDAR, and project the generated unit point cloud data onto an image captured within the movement distance. At this point, the map generation unit 225 may project the generated unit point cloud data onto an image captured at a point in the middle of the movement distance. For example, the map generation unit 225 may generate a virtual event reference point by calculating a distance on the basis of GPS data acquired by a GPS receiver installed together with the LiDAR and the camera. At this point, when the virtual event reference points based on the distance are a 10 m point and a 20 m point, the map generation unit 225 may select an image acquired by the camera at a 15 m point, which is a value between the 10 m point and the 20 m point. Here, the grouped unit point cloud data may include location information based on the world coordinate system.

In addition, the map generation unit 225 may project the unit point cloud data onto an image table including information about a camera that has captured the image, and a horizontal axis pixel (x) and a vertical axis pixel (y) of the image. That is, the map generation unit 225 may store information on the point matched to each pixel of the image in the image table. Here, information on the point may include LiDAR-based location information (x, y, z), an intensity value, matched color information (r, g, b), and location information based on the world coordinate system.

In addition, the map generation unit 225 may detect the distance of a point using the LiDAR-based location information among information on a point per pixel of the image table. At this point, when information on a plurality of points is stored in one pixel, the map generation unit 225 may delete the points other than a point of the shortest distance from the LiDAR among the plurality of points. That is, when a plurality of points exists in one pixel, the map generation unit 225 may determine that the points other than the nearest point are points corresponding to the hidden area on the image and deletes them.

In addition, the map generation unit 225 may compare distance between points existing in neighboring pixels as many as a preset number of pixels for the filtered pixel, and remove pixels at a distance farther than a preset value based on the filtered pixels.

In addition, the map generation unit 225 may generate a color map on the basis of intensity values of the points included in the filtered image table, color information, and location information based on the world coordinate system.

In addition, as the map generation unit 225 separates points having a preset color from the point cloud data assigned with the color of the image, and generates a color map by correcting the color of the separated points based on the colors of neighboring points, noise generated as a bright color is applied to an object having a specific dark color due to the color of the sky or reflection of light can be removed effectively.

Specifically, the map generation unit 225 may assign a color of an image located at the same coordinates as those of each point included in the point cloud data. That is, the map generation unit 225 may generate unit point cloud data by grouping the point cloud data on the basis of the movement distance of the LiDAR, and project the generated unit point cloud data onto an image captured within the movement distance. Then, the map generation unit 225 may generate a color map on the basis of intensity, color information, and location information based on the world coordinate system of the projected points.

In addition, the map generation unit 225 may separate points having a preset color among the points of a specific height or higher with respect to the ground. At this point, the map generation unit 225 may generate a histogram based on the brightness value of colored point cloud data, and detect points having an intensity value greater than or equal to a preset value. In addition, the map generation unit 225 may separate points having a preset color, a saturation lower than a preset value, and a brightness higher than a preset value from the colored point cloud data.

For example, the map generation unit 225 may correct a bright color applied to a tree due to the color of the sky or reflection of light on the precise road map. To this end, the map generation unit 225 may separate points having a preset color among the points having a specific height or higher with respect to the ground so as not to affect the lanes. At this point, the map generation unit 225 may separate points having a color set in advance, a saturation lower than a preset value, and a brightness higher than a preset value from the colored point cloud data so that only the points corresponding to the color of the sky or reflection of light may be separated. For example, the map generation unit 225 may separate points having a Hue value of 160 to 300 that may correspond to the color of the sky. At this point, when the points having a Hue value of 160 to 300 are separated, the points included in the traffic facilities in blue color may also be separated. Accordingly, the map generation unit 225 may separate the points having a Hue value of 160 to 300, but exclude points having an intensity value higher than a preset value. That is, the map generation unit 225 may exclude points corresponding to traffic facilities based on the intensity value by utilizing that a road sign having a flat shape has a high intensity value. Here, the intensity value may be signal strength of the LiDAR. For example, the map generation unit 225 may exclude points having an intensity value of 250 or more among the points having a Hue value of 160 to 300.

Then, the map generation unit 225 may generate a color map after removing the separated points. However, it is not limited thereto, and the map generation unit 225 may correct the color of each separated point to a color of a point closest to the separated point, other than the separated point. For example, the map generation unit 225 may correct the color of each separated point to an average color value of points located within a preset distance from the separated point, other than the separated point. At this point, the map generation unit 225 may detect a point closest to the separated point using an octree algorithm.

As a next configuration, the learning data generation unit 230 may process the map generated by the map generation unit 225 as learning data. For example, the learning data generation unit 230 may process the generated map as learning data that will be used for autonomous driving.

In addition, the learning data generation unit 230 may separately generate learning data for traffic facilities in order to increase the learning recognition rate for the traffic facilities. At this point, the learning data generation unit 230 may generate learning data for the generated map and learning data for the traffic facilities as one piece of learning data and provide the same to the outside.

That is, the learning data generation unit 230 may generate learning data by processing traffic facility sample images provided by the Korea Road Traffic Authority to be similar to the images actually captured by a camera.

To this end, the learning data generation unit 230 may collect traffic facility sample images, generate at least one processed image by processing the collected traffic facility sample images to be recognized as images captured by a camera installed in the vehicle, and generate learning data by inserting a background into the generated at least one processed image.

Specifically, the learning data generation unit 230 may generate a plurality of first processed images by applying shearing to the collected traffic facility sample images within a specific angular range. At this point, the learning data generation unit 230 may apply shearing to the collected traffic facility sample images with a random value between −10 and 10°. That is, the learning data generation unit 230 may apply shearing to the traffic facility sample image within a specific angular range in order to generate various types of learning data according to the direction and angle captured by the camera. At this point, the traffic facility sample image may be a front view of a traffic facility.

In addition, the learning data generation unit 230 may generate a second processed image by applying Gaussian blur to the generated first processed image. At this point, the learning data generation unit 230 may randomly apply Gaussian blur to the first processed image within a radius value for a preset pixel. That is, the learning data generation unit 230 may apply Gaussian blur to generate various types of learning data that appear clear or blurry according to the shooting environment of a camera.

In addition, the learning data generation unit 230 may generate a plurality of third processed images by applying an intensity value to the second processed image. Here, the intensity value may be intensity of brightness. That is, the learning data generation unit 230 may randomly apply an intensity value to the second processed image within a preset range of intensity value. That is, the learning data generation unit 230 may randomly apply an intensity value to generate learning data having various intensity values according to the shooting environment of a camera. At this point, the learning data generation unit 230 may selectively apply the intensity value to a specific area of the second processed image. That is, since there may be a situation in which intensity values are different in various areas even in a traffic facility image, the intensity value may be selectively applied to a specific area.

Then, the learning data generation unit 230 may generate learning data by inserting a background into the generated at least one processed image. Here, the background may be a random area on a plurality of 2D images collected through a camera mounted on the vehicle. At this point, the learning data generation unit 230 may generate learning data by randomly applying the size of the processed image to the background. In addition, the learning data generation unit 230 may generate learning data by randomly applying the position of the processed image to the background.

In this way, the learning data generation unit 230 may secure sufficient learning data for the traffic facilities with limited amounts of images by processing the traffic facility sample image to be recognized as an image actually captured by the camera and generating learning data by inserting a background into the processed image.

Hereinafter, hardware for implementing the logical components of the data generation device 200 according to an embodiment of the present invention as described above will be described in more detail.

Figure 3:
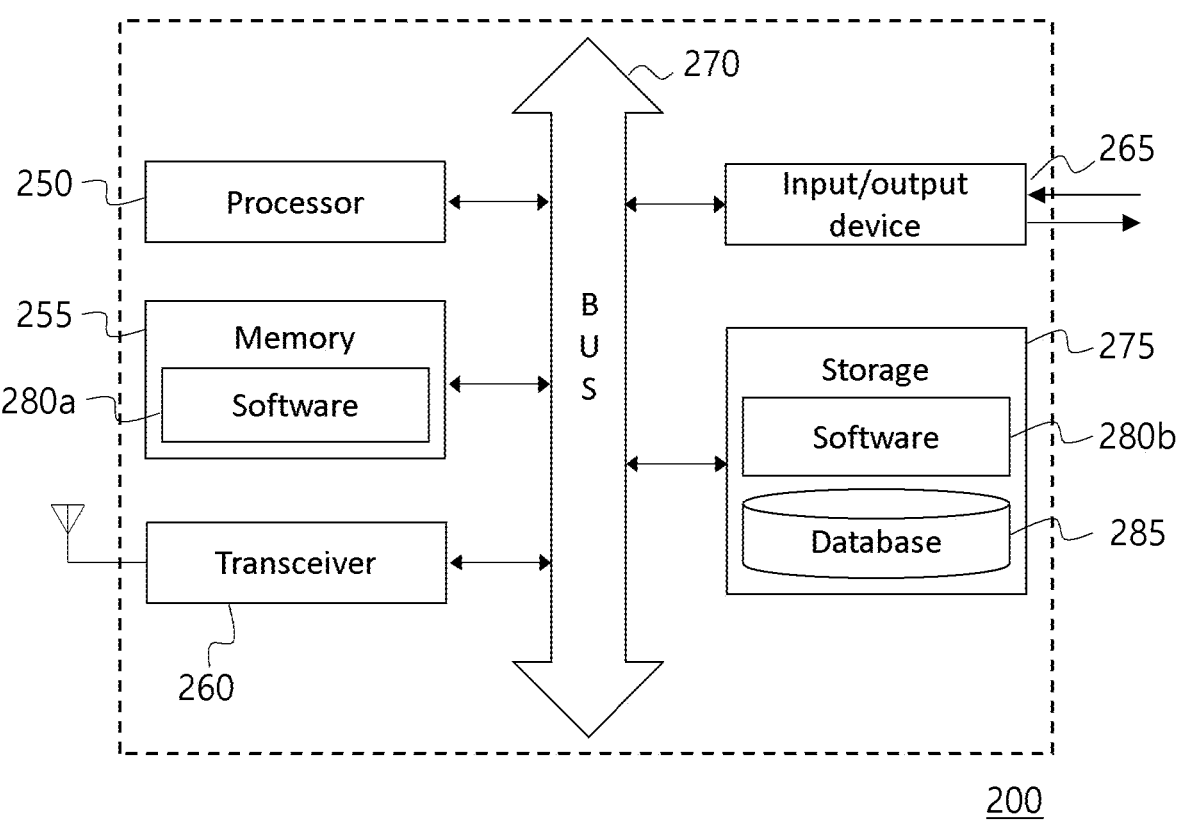
FIG. 3 is a block diagram showing the hardware configuration of a data generation device according to an embodiment of the present invention.

FIG. 3 is a block diagram showing the hardware configuration of a data generation device according to an embodiment of the present invention.

As shown in FIG. 3, the data generation device 200 may be configured to include a processor 250, a memory 255, a transceiver 260, an input/output device 265, a data bus 270, and storage 275.

The processor 250 may implement operations and functions of the data generation device 200 on the basis of instructions according to the software 280a that implements the method according to the embodiments of the present invention loaded on the memory 255. The software 280a implementing the method according to the embodiments of the present invention may be loaded on the memory 255. The transceiver 260 may transmit and receive data to and from the data collection device 100. The input/output device 265 may receive data needed for the functional operation of the data generation device 200 and output a data generation result or the like. The data bus 270 is connected to the processor 250, the memory 255, the transceiver 260, the input/output device 265, and the storage 275 to perform a function of a movement path for transferring data between the components.

The storage 275 may store application programming interfaces (API), library files, resource files, and the like needed for execution of the software 280a in which the method according to the embodiments of the present invention is implemented. The storage 275 may store software 280b in which the method according to the embodiments of the present invention is implemented. In addition, the storage 275 may store information needed for performing the method according to the embodiments of the present invention.

According to an embodiment of the present invention, the software 280a and 280b for implementing a method of generating a map including direction information, which is loaded on the memory 255 or stored in the storage 275, may be a computer program recorded on a recording medium to execute, by the processor 250, the steps of: receiving at least one image captured by at least one camera fixedly installed in the vehicle; detecting traffic facilities from the received at least one image; generating direction information on the basis of point cloud data acquired by the LiDAR for the detected traffic facilities; and generating a map including the generated direction information.

According to an embodiment of the present invention, the software 280a and 280b for implementing a method of generating learning data for traffic facilities, which is loaded on the memory 255 or stored in the storage 275, may be a computer program recorded on a recording medium to execute, by the processor 250, the steps of: collecting traffic facility sample images stored in advance; generating at least one processed image by processing the collected traffic facility sample images to be recognized as images captured by a camera installed in the vehicle; and generating learning data by inserting a background into the generated at least one processed image.

According to an embodiment of the present invention, the software 280a and 280b for implementing a method of generating a map using an aviation LiDAR, which is loaded on the memory 255 or stored in the storage 275, may be a computer program recorded on a recording medium to execute, by the processor 250, the steps of: receiving the point cloud data acquired from the LiDAR installed in the aviation device; projecting a top-view of the received point cloud data; and generating a map by scanning the projected point cloud data in a direction perpendicular to the ground.

According to an embodiment of the present invention, the software 280a and 280b for implementing a color map generation method based on projection, which is loaded on the memory 255 or stored in the storage 275, may be a computer program recorded on a recording medium to execute, by the processor 250, the steps of: receiving an image captured by the camera and point cloud data acquired from the LiDAR; projecting the received point cloud data onto the image; filtering the point cloud data projected onto the image based on the distance; and generating a color map by assigning the color of the image to the filtered point cloud data.

According to an embodiment of the present invention, the software 280*a* and 280*b* for implementing a color map generation method to which color correction is applied, which is loaded on the memory 255 or stored in the storage 275, may be a computer program recorded on a recording medium to execute, by the processor 250, the steps of: assigning the color of the image captured through the camera to the point cloud data acquired from the LiDAR; separating points having a preset color from the colored point cloud data; and generating a color map by correcting colors of the separated points based on the colors of neighboring points.

More specifically, the processor 250 may include an Application-Specific Integrated Circuit (ASIC), another chipset, a logic circuit, and/or a data processing device. The memory 255 may include read-only memory (ROM), random access memory (RAM), flash memory, a memory card, a storage medium, and/or other storage devices. The transceiver 260 may include a baseband circuit for processing wired/wireless signals. The input/output device 265 may include an input device such as a keyboard, a mouse, and/or a joystick, an image output device such as a Liquid Crystal Display (LCD), an Organic LED (OLED), and/or an active matrix OLED (AMOLED), and a printing device such as a printer, a plotter, or the like.

When the embodiments included in this specification are implemented as software, the method described above may be implemented as a module (process, function, or the like) that performs the functions described above. The module may be loaded on the memory 255 and executed by the processor 250. The memory 255 may be inside or outside the processor 250 and connected to the processor 250 by various well-known means.

Each component shown in FIG. 3 may be implemented by various means, for example, hardware, firmware, software, or a combination thereof. When a component is implemented as hardware, an embodiment of the present invention may be implemented as one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In addition, when the component is implemented as firmware or software, an embodiment of the present invention may be implemented in the form of a module, procedure, function, or the like that performs the functions or operations described above, and recorded on a recording medium that can be read through various computer means. Here, the recording medium may include program commands, data files, data structures, and the like individually or in combination. Program instructions recorded on a recording medium may be instructions specially designed and configured for the present invention or those known to and used by those skilled in computer software. For example, the recording medium includes magnetic media such as hard disks, floppy disks, and magnetic tapes, optical media such as Compact Disk Read Only Memory (CD-ROMs) and Digital Video Disks (DVDs), magneto-optical media such as floptical disks, and hardware devices specially configured to store and execute program instructions, such as ROM, RAM, flash memory, and the like. Examples of the program instructions may include high-level language codes that can be executed by a computer using an interpreter or the like, as well as machine language codes generated by a compiler. These hardware devices may be configured to operate as one or more pieces of software to perform the operations of the present invention, and vice versa.

Hereinafter, a method of generating a map including direction information according to an embodiment of the present invention will be described in detail.

Figure 4:
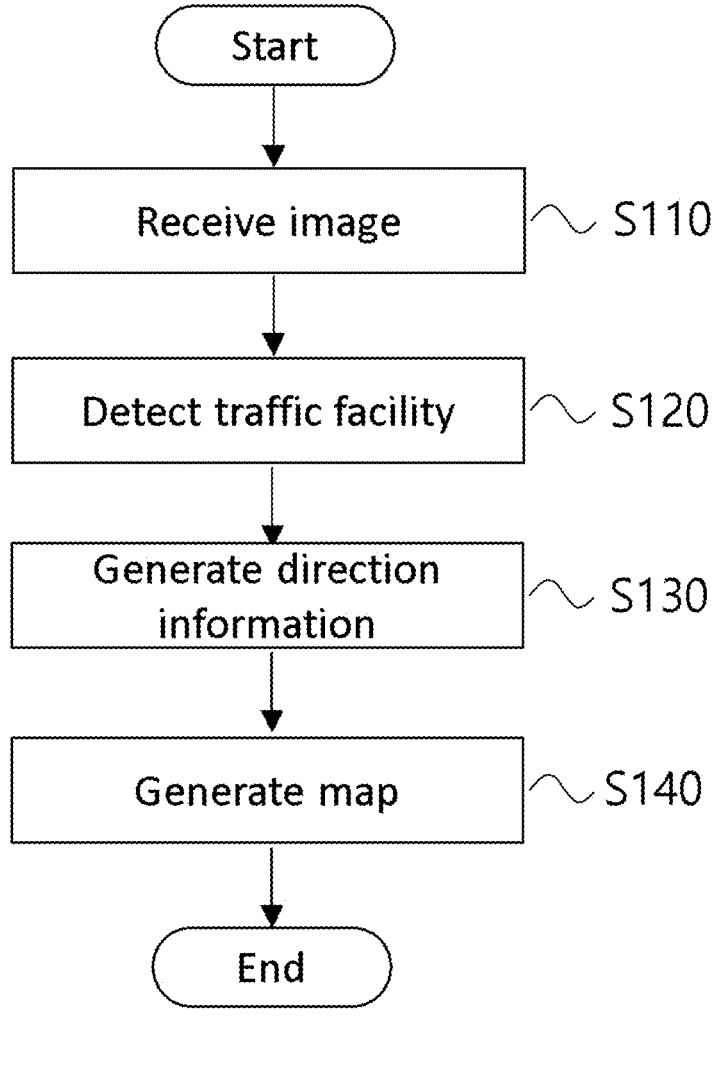
FIG. 4 is a flowchart illustrating a method of generating a map including direction information according to an embodiment of the present invention.

FIG. 4 is a flowchart illustrating a method of generating a map including direction information according to an embodiment of the present invention.

Referring to FIG. 4, at step S110, the data generation device may receive an image captured by a camera.

Next, at step S120, the data generation device may detect traffic facilities from the received at least one image. At this point, the data generation device may detect traffic facilities from the image using a deep learning-based object detection algorithm. Here, in order to extract an accurate direction of the traffic facility, the data generation device may determine direction information at step S130 only when the traffic facility enters within a predetermined distance or when the bounding box of the detected traffic facility is not imbalanced and the number of point clouds included in the detected traffic facility is greater than or equal to a predetermined number.

Next, at step S130, the data generation device may generate direction information on the basis of the point cloud data acquired by the LiDAR corresponding to the detected traffic facilities. At this point, the data generation device may detect traffic facilities from the 2D image using distance-based Euclidean clustering. That is, when point cloud data for generating direction information is extracted, the data generation device may configure clusters for the traffic facilities through the Euclidean clustering algorithm in order to prevent extraction of point cloud data of objects other than the detected traffic facility.

In addition, the data generation device may perform down sampling by filtering the point clouds included in the detected traffic facility in the form of a voxel grid. That is, the data generation device may down-sample imbalanced point clouds among the point clouds included in the detected traffic facility in a balanced form.

In addition, the data generation device may accumulate point cloud data for the detected traffic facilities, and generate direction information when a preset value is satisfied. That is, the data generation device may generate direction information while it secures sufficient point clouds for traffic facilities by accumulating the point clouds.

In addition, the data generation device may acquire a representative plane by randomly searching for point clouds for the detected traffic facilities using a Random Sample Consensus (RANSAC) algorithm. That is, the data generation device may randomly select three points from the point cloud for the detected traffic facilities, and obtain a plane passing through the selected three points. At this point, inlier points having a distance to the plane smaller than a preset value may be identified, and the number of inlier points may be obtained. At this point, the data generation device may select a plane having the largest number of inlier points as the representative plane.

In addition, the data generation device may calculate a normal vector that extends vertically from the plane using a plane equation on the basis of the representative plane.

Then, at step S140, the data generation device may generate a map including direction information for the generated traffic facility. At this point, the data generation device may display the generated normal vector on the map or include the normal vector in the meta information of the map.

Hereinafter, a method of generating learning data for traffic facilities according to an embodiment of the present invention will be described in detail.

Figure 5:
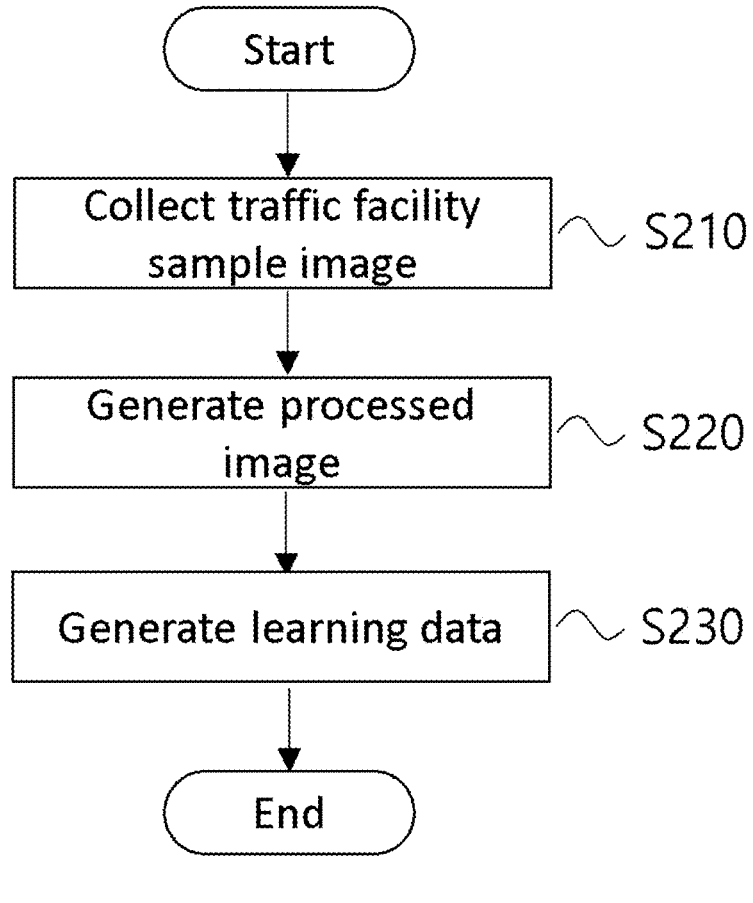
FIG. 5 is a flowchart illustrating a method of generating learning data for traffic facilities according to an embodiment of the present invention.

FIG. 5 is a flowchart illustrating a method of generating learning data for traffic facilities according to an embodiment of the present invention.

Referring to FIG. 5, at step S210, the data generation device may collect traffic facility sample images. Here, the traffic facility sample image may be a front view of a traffic facility provided by the Korea Road Traffic Authority.

Next, at step S220, the data generation device may generate at least one processed image by processing the collected traffic facility sample images to be recognized as images captured by a camera installed in the vehicle.

Specifically, the data generation device may generate a plurality of first processed images by applying shearing to the collected traffic facility sample images within a specific angular range. At this point, the data generation device may apply shearing to the collected traffic facility sample images with a random value between −10 and 10°. That is, the data generation device may apply shearing to the traffic facility sample image within a specific angular range in order to generate various types of learning data according to the direction and angle captured by the camera.

In addition, the data generation device may generate a second processed image by applying Gaussian blur to the generated first processed image. At this point, the data generation device may randomly apply Gaussian blur to the first processed image within a radius value for a preset pixel. That is, the data generation device may apply Gaussian blur to generate various types of learning data that appear clear or blurry according to the shooting environment of a camera.

In addition, the data generation device may generate a plurality of third processed images by applying an intensity value to the second processed image. That is, the data generation device may randomly apply an intensity value to the second processed image within a preset range of intensity value. The data generation device may randomly apply an intensity value to generate learning data having various intensity values according to the shooting environment of a camera. At this point, the data generation device may selectively apply the intensity value to a specific area of the second processed image. That is, since there may be a situation in which intensity values are different in various areas even in a traffic facility image, the intensity value may be selectively applied to a specific area.

Then, at step S230, the data generation device may generate learning data by inserting a background into the generated at least one processed image. Here, the background may be a random area on a plurality of 2D images collected through a camera mounted on the vehicle. At this point, the data generation device may generate learning data by randomly applying the size of the processed image to the background. In addition, the data generation device may generate learning data by randomly applying the position of the processed image to the background.

Hereinafter, a method of generating a map using an aviation LiDAR according to an embodiment of the present invention will be described in detail.

Figure 6:
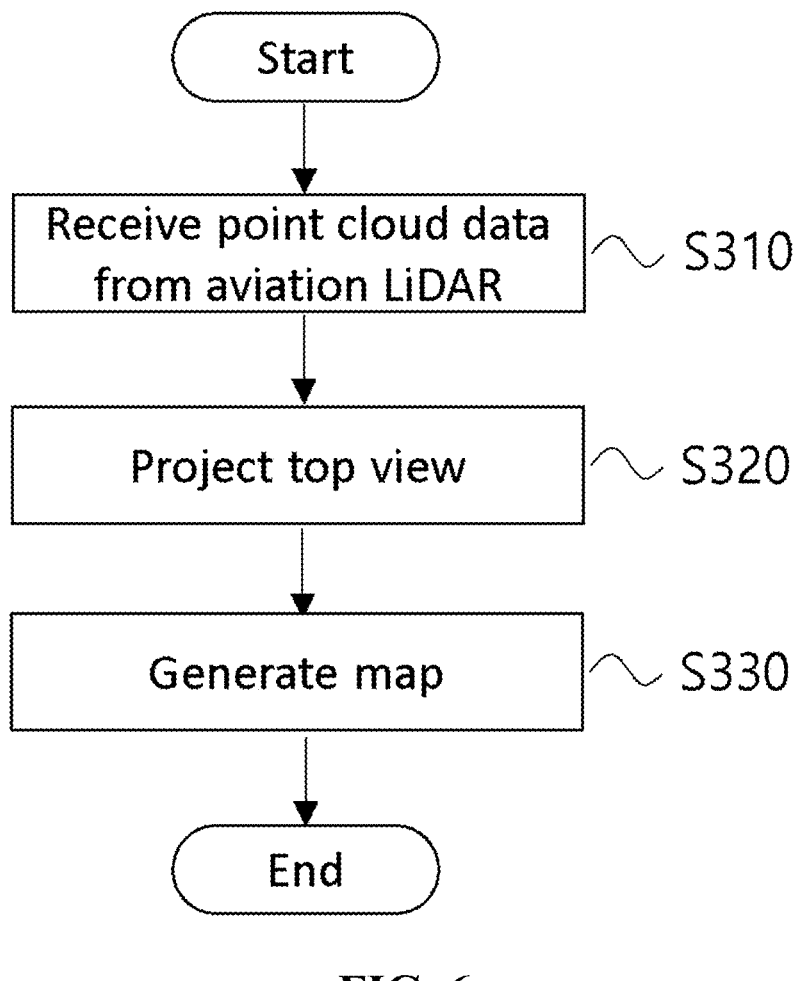
FIG. 6 is a flowchart illustrating a method of generating a map using an aviation LiDAR according to an embodiment of the present invention.

FIG. 6 is a flowchart illustrating a method of generating a map using an aviation LiDAR according to an embodiment of the present invention.

Referring to FIG. 6, at step S310, the data generation device may receive point cloud data of the ground acquired from a LiDAR installed in an aviation device.

Next, at step S320, the data generation device may project a top-view of the received point cloud data. That is, the data generation device may generate point cloud data of a view point seeing the ground vertically from the airborne device.

Then, at step S330, the data generation device may generate a map by scanning the projected point cloud data in a direction perpendicular to the ground.

Specifically, the data generation device may detect a reference area of the projected point cloud data, and detect an edge of an object while scanning the reference area in a direction perpendicular to the ground. Here, the reference area may be the lowermost surface of the object included in the point cloud data. That is, the data generation device may detect the reference area, which is the lowermost surface of the object, and detect the edge of the object while scanning in the upper direction of the object from the reference area.

To this end, the data generation device may extract a closed curve from the point cloud located within a preset distance among the scanned point cloud data, and detect the closed curve as the edge of the object.

In addition, when there is a difference between the reference area and the area of the detected edge as much as a preset value or more, the data generation device may detect edges detected from the reference area before the edge where the difference has occurred.

In addition, the data generation device may model an area from the reference area to an edge detected before the edge where the difference has occurred. At this point, the data generation device may update the area from the previous reference area to the edge where the difference has occurred as a new reference area.

Here, the data generation device may model an object by connecting the point cloud included in an area from the reference area to the edge detected before the edge where the difference has occurred in a triangular shape to maximize the minimum value of the interior angle of the triangle. That is, the data generation device may model the object through Delaunay triangulation. In other words, the data generation device may configure a super triangle including all the point cloud of the detected edge, and when no other points exist in a circle containing the three points in the super triangle, the triangle may be added as a Delaunay triangle for each point. At this point, the super triangle may be deleted after the process of constructing a Delaunay triangular network is completed. Then, the data generation device may form an external surface by meshing the modeled object.

Hereinafter, a color map generation method based on projection according to an embodiment of the present invention will be described in detail.

Figure 7:
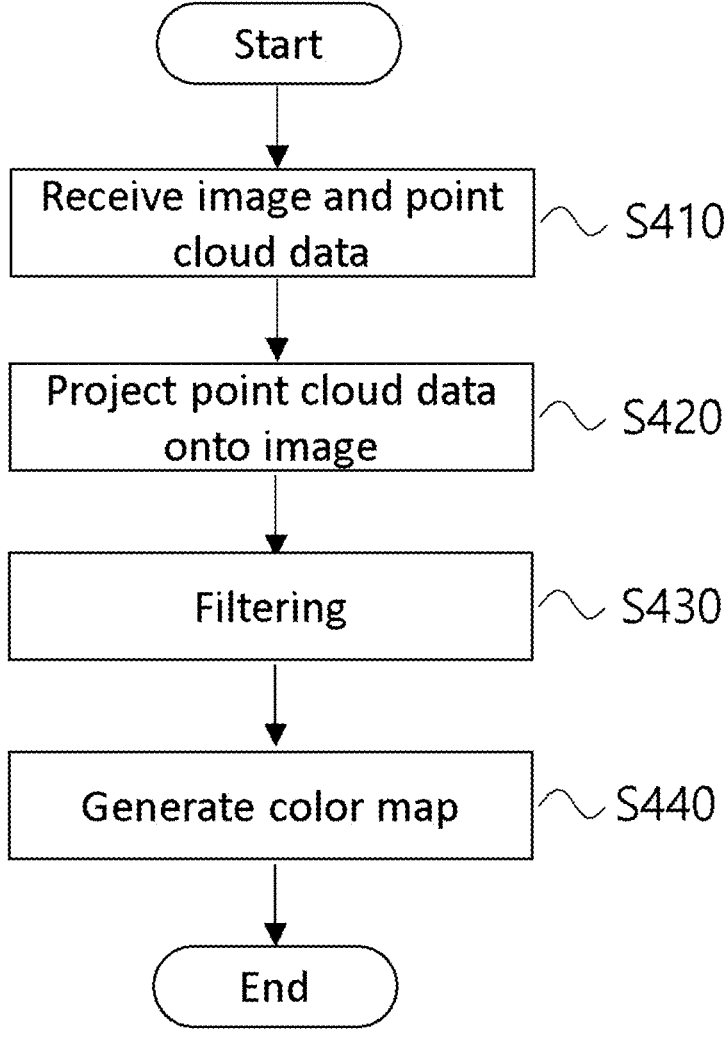
FIG. 7 is a flowchart illustrating a color map generation method based on projection according to an embodiment of the present invention.

FIG. 7 is a flowchart illustrating a color map generation method based on projection according to an embodiment of the present invention.

Referring to FIG. 7, at step S410, the data generation device may receive an image captured by a camera and point cloud data acquired from a LiDAR.

Next, at step S420, the data generation device may project the received point cloud data onto the image.

Specifically, the data generation device may generate unit point cloud data by grouping the point cloud data on the basis of the movement distance of the LiDAR, and project the generated unit point cloud data onto an image captured within the movement distance. At this point, the data generation device may project the generated unit point cloud data onto an image captured at a point in the middle of the movement distance. Here, the grouped unit point cloud data may include location information based on the world coordinate system. That is, the data generation device may project the unit point cloud data onto an image table including information about a camera that has captured the image, and a horizontal axis pixel (x) and a vertical axis pixel (y) of the image. That is, the data generation device may store information on the point matched to each pixel of the image in the image table. Here, information on the point may include LiDAR-based location information (x, y, z), an intensity value, matched color information (r, g, b), and location information based on the world coordinate system.

Next, at step S430, the data generation device may filter the point cloud data projected onto the image based on the distance.

Specifically, the data generation device may detect the distance of a point using the LiDAR-based location information among information on a point per pixel of the image table. At this point, when information on a plurality of points is stored in one pixel, the data generation device may delete the points other than a point of the shortest distance from the LiDAR among the plurality of points.

In addition, the data generation device may compare distance between neighboring pixels as many as a predetermined number of pixels based on a point of the shortest distance, and remove pixels at a distance farther than a preset value.

Then, at step S440, the data generation device may generate a color map on the basis of intensity values of the points included in the filtered image table, color information, and location information based on the world coordinate system.

Hereinafter, a color map generation method to which color correction is applied according to an embodiment of the present invention will be described in detail.

Figure 8:
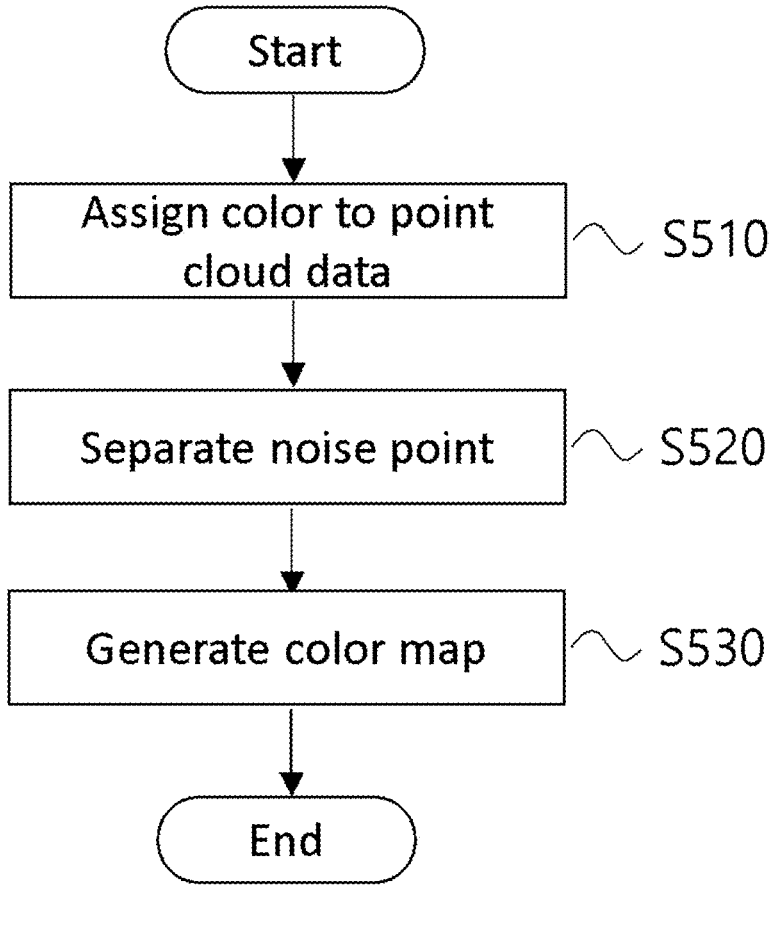
FIG. 8 is a flowchart illustrating a color map generation method to which color correction is applied according to an embodiment of the present invention.

FIG. 8 is a flowchart illustrating a color map generation method to which color correction is applied according to an embodiment of the present invention.

Referring to FIG. 8, at step S510, the data generation device may assign a color of an image captured through a camera to point cloud data acquired from a LiDAR.

Specifically, the data generation device may generate unit point cloud data by grouping the point cloud data on the basis of the movement distance of the LiDAR, and project the generated unit point cloud data onto an image captured within the movement distance. Then, the data generation device may generate a color map on the basis of intensity, color information, and location information based on the world coordinate system of the projected points.

Next, at step S510, the data generation device may separate points having a preset color among the points of a specific height or higher with respect to the ground. At this point, the data generation device may generate a histogram based on the brightness value of colored point cloud data, and detect points having an intensity value greater than or equal to a preset value. In addition, the data generation device may separate points having a preset color, a saturation lower than a preset value, and a brightness higher than a preset value from the colored point cloud data.

Then, at step S530, the data generation device may generate a color map after removing the separated points. However, it is not limited thereto, and the data generation device may correct the color of each separated point to a color of a point closest to the separated point, other than the separated point.

Figure 9:
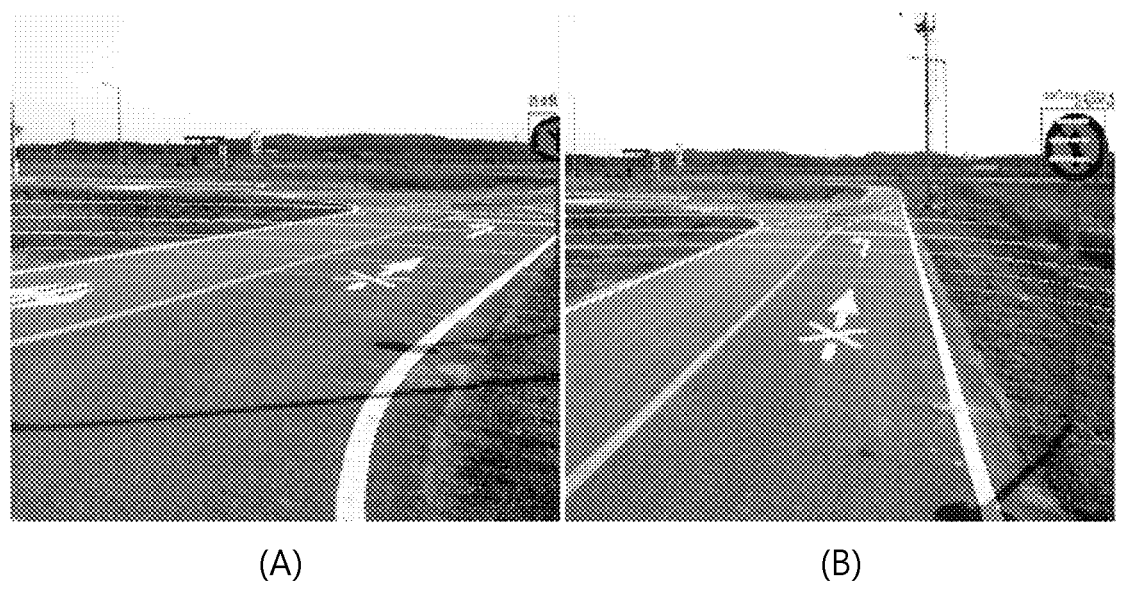
FIGS. 9 and 10 are exemplary views for explaining a method of generating a map including direction information according to an embodiment of the present invention.
Figure 10:

FIGS. 9 and 10 are exemplary views for explaining a method of generating a map including direction information according to an embodiment of the present invention.

As shown in FIG. 9, the data generation device may detect traffic facilities from a road image captured by a camera. For example, the data generation device may recognize traffic facilities through YOLO, which is a detection algorithm using a deep learning method. That is, the data generation device may detect a bounding box including traffic facilities through the YOLO algorithm, and additionally detect traffic facilities inside the detected bounding box.

In addition, the data generation device may generate direction information for the traffic facilities by using the detected traffic facility image and the point cloud data acquired by the LiDAR at the same time.

At this time, the data generation device may not extract direction information when the number of point cloud data included in the detected traffic facility is insufficient or the bounding box is imbalanced as shown in FIG. 9(A), and may generate direction information of the traffic facility when the bounding box is not imbalanced and the number of point cloud data is greater than or equal to a preset value as shown in FIG. 9(B).

Through this, as the data generation device generates direction information based on the point cloud data for the traffic facilities detected on the image as shown in FIG. 10, the precise road map may be effectively used through the generated direction information.

For example, the precise road map including direction information may selectively provide information to drivers who need information on traffic facilities pointing a specific direction, or support managers, who manage the traffic facilities, to determine that maintenance is required when the direction of a traffic facility is changed in comparison with the initially installed direction.

Figure 11:
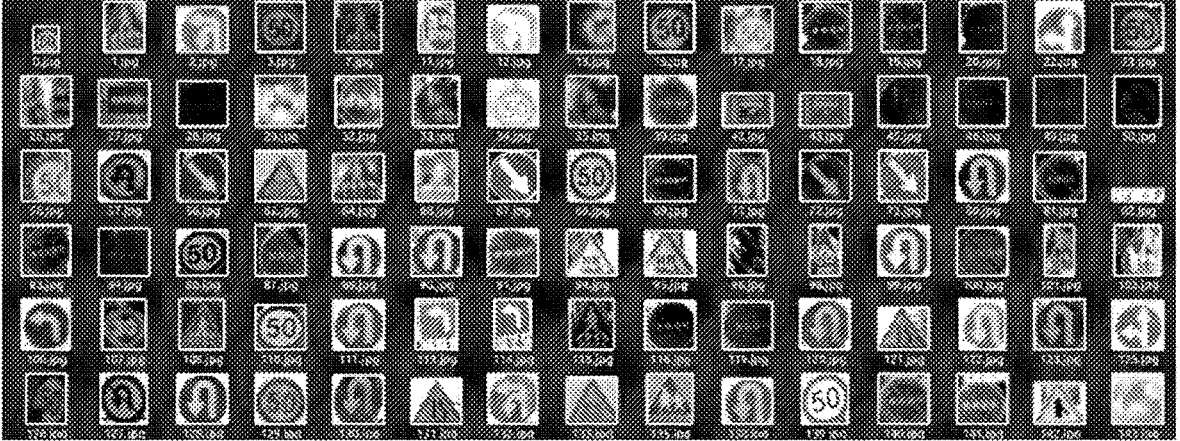
FIGS. 11 to 13 are exemplary views for explaining a method of generating learning data for traffic facilities according to an embodiment of the present invention.
Figure 12:
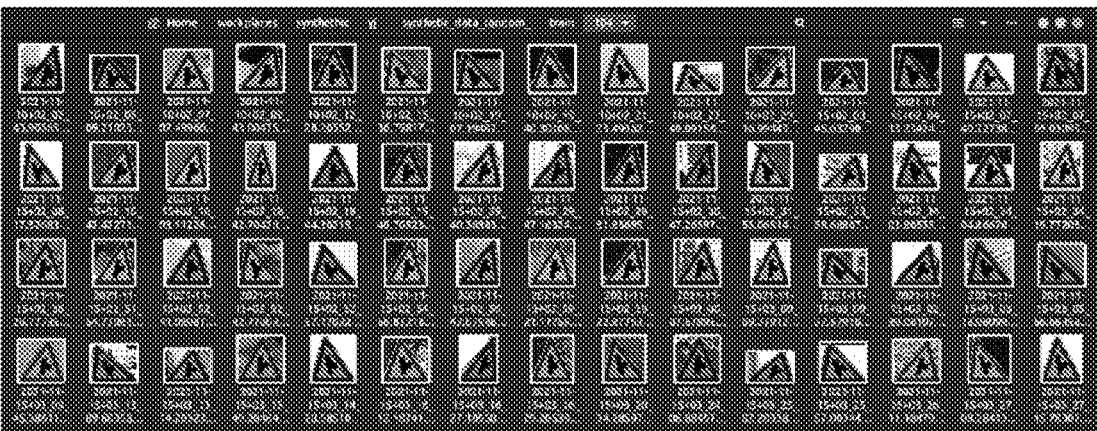
Figure 13:
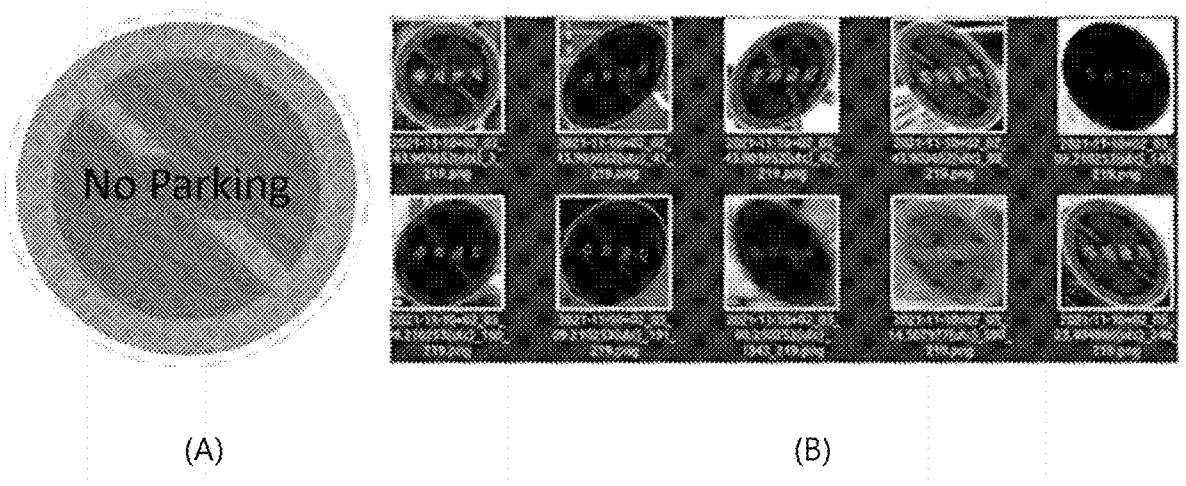

FIGS. 11 to 13 are exemplary views for explaining a method of generating learning data for traffic facilities according to an embodiment of the present invention.

As shown in FIG. 11, although crawling has been performed on traffic facilities from a road image, there is a problem in that the amount of data is small, and a user himself or herself should cut out traffic facility areas. In addition, although there are many traffic facilities such as 'speed limit', it is confirmed that rare traffic facilities such as 'right of way', 'allow bicycles to pass', and the like are difficult to obtain even through the crawling.

Accordingly, as shown in FIG. 12, although a classification model has been learned after generating synthetic images by applying only shearing on the basis of traffic facility sample images provided by the Korea Road Traffic Authority, as it is severely different from an image in an actual environment, it is confirmed that accuracy of the classification is low.

Accordingly, in order to increase the similarity between traffic facility sample images and images in an actual environment, a map generation device according to an embodiment of the present invention may generate a processed image by applying shearing, Gaussian blur, and a random intensity value to the traffic facility sample images (A), and generate a plurality of training data such as (B) by inserting a background of a random area into the processed image as shown in FIG. 13.

In addition, in order to confirm the learning effect of the generated learning data, the same learning model (CoAT-Net) is trained through learning data obtained by applying only shearing to the traffic facility sample images and learning data generated according to an embodiment of the present invention as shown in FIG. 12.

As a result, the learning data obtained by applying only shearing shows an accuracy of 8% in 246 test images, but as a result of performing a test in the same manner after learning the learning data obtained by applying the method of generating learning data for traffic facilities according to an embodiment of the present invention, an accuracy of 66.2% is shown.

Finally, a total of 42,920 pieces of learning data are generated for 107 road signs by applying the method of generating learning data for traffic facilities according to an embodiment of the present invention, and a classification model (EfficientNet V2 m) is trained.

As a result, when the trained classification model is evaluated for a total of 2,454 images (1,982 images extracted from actual driving data, and 472 images obtained through crawling and cropping), it is confirmed that an accuracy of 96.169% is shown.

Figure 14:
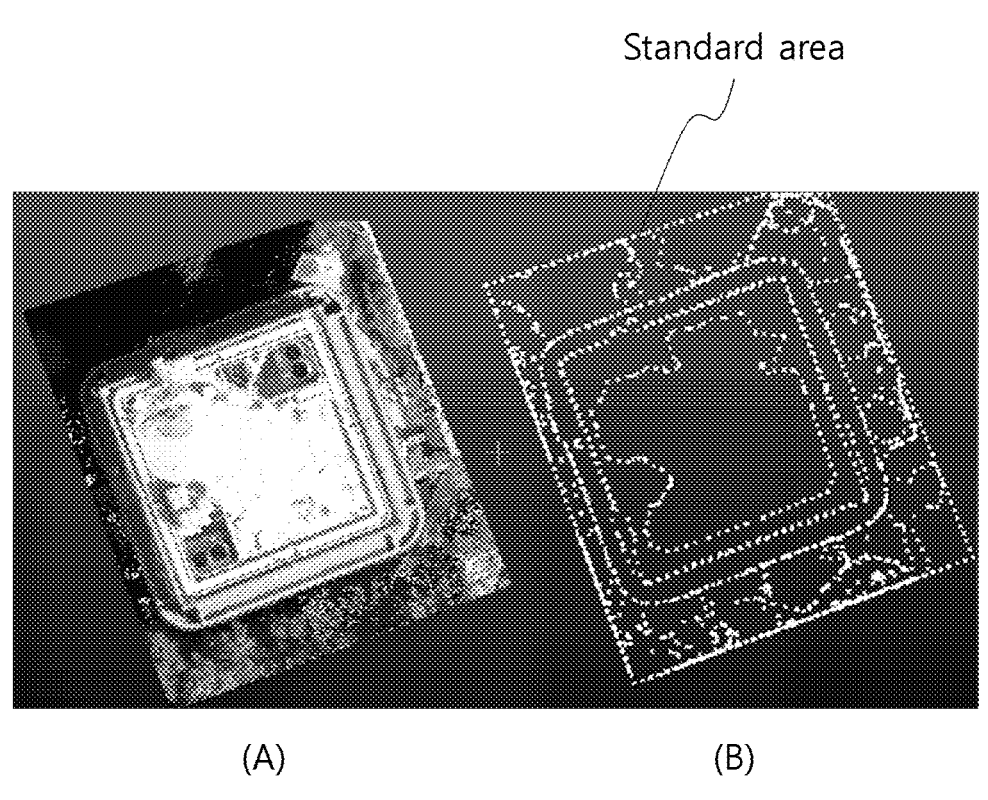
FIGS. 14 to 16 are exemplary views for explaining a method of generating a map using an aviation LiDAR according to an embodiment of the present invention.
Figure 15:
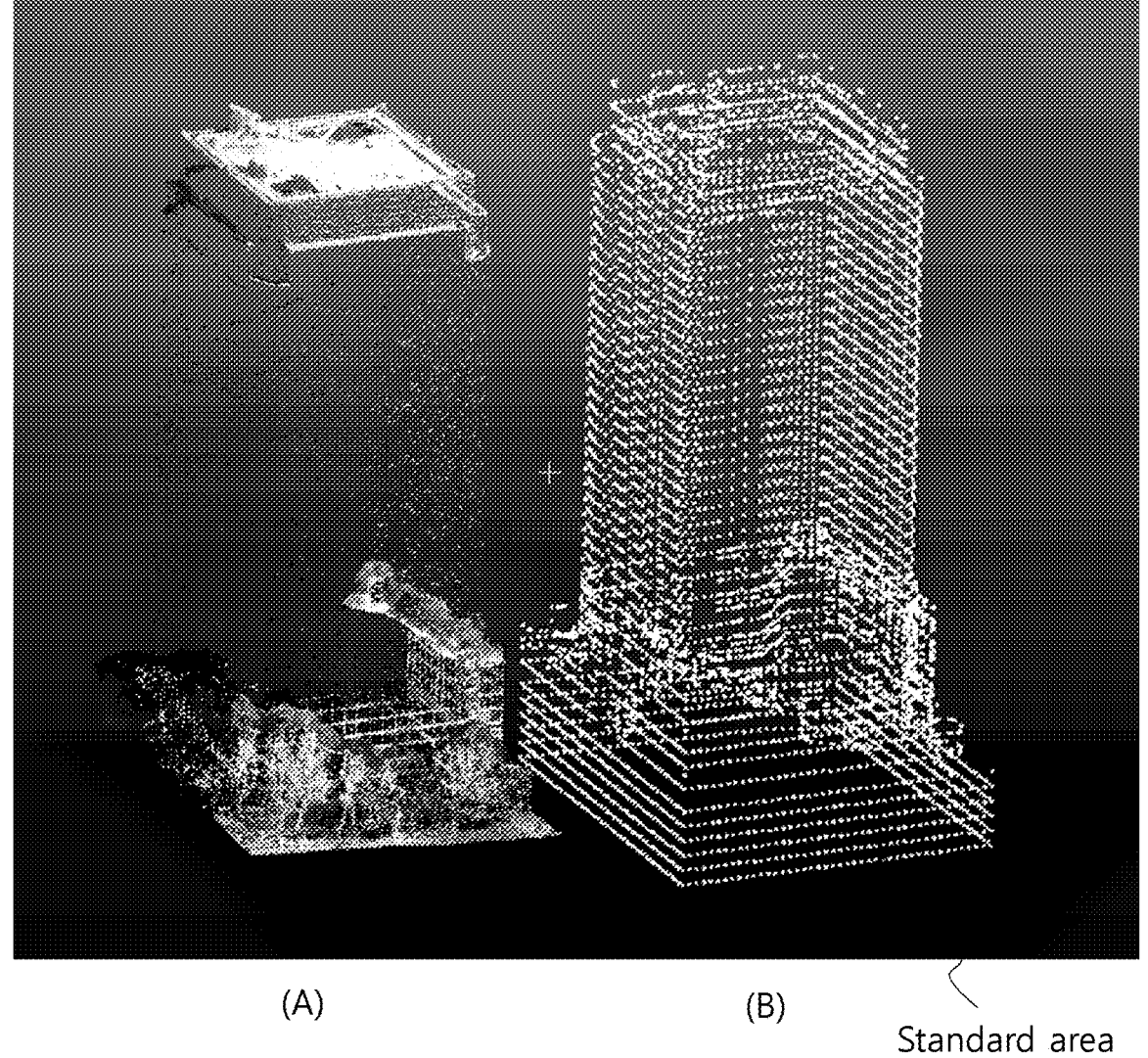
Figure 16:
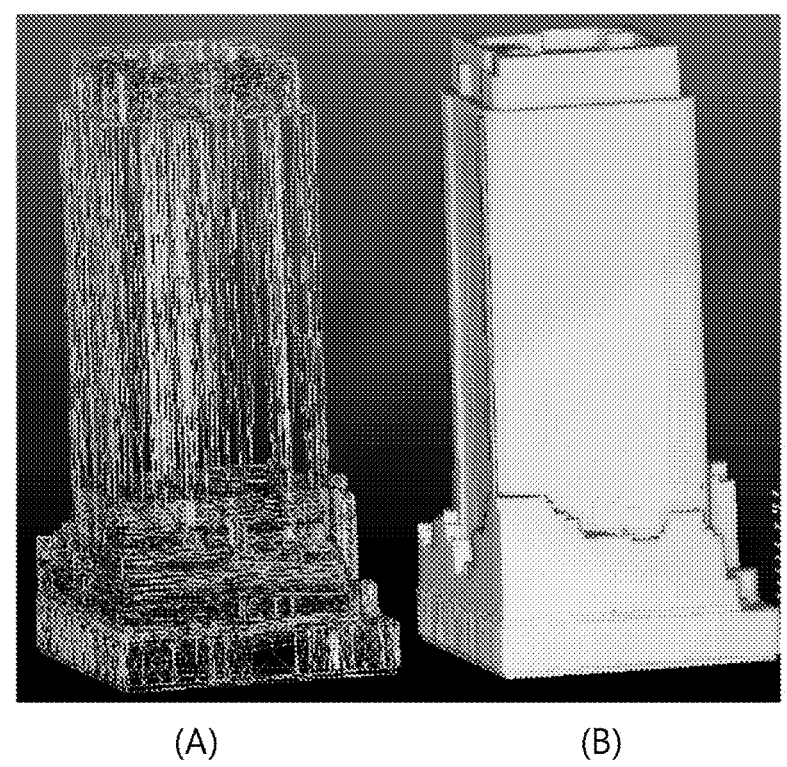

FIGS. 14 to 16 are exemplary views for explaining a method of generating a map using an aviation LiDAR according to an embodiment of the present invention.

As shown in FIG. 14, the data generation device may project point cloud data A of a view point seeing the ground vertically from the airborne device, detect a reference area of the projected point cloud data, and detect an edge B of an object while scanning the reference area in a direction perpendicular to the ground.

As shown in FIG. 15, the data generation device may detect the reference area, which is the edge of the lowermost surface of the object, and detect the edge of the object while scanning in the upper direction of the object from the reference area.

At this point, when there is a difference between the reference area and the area of the detected edge as much as a preset value or more, the data generation device may detect edges detected from the reference area before the edge where the difference has occurred.

In addition, the data generation device may model an area from the reference area to an edge detected before the edge where the difference has occurred. At this point, the data generation device may update the area from the previous reference area to the edge where the difference has occurred as a new reference area.

Here, as shown in FIG. 16(A), the data generation device may model the object through Delaunay triangulation. In other words, the data generation device may configure a super triangle including all the point cloud of the detected edge, and when no other points exist in a circle containing the three points in the super triangle, the triangle may be added as a Delaunay triangle for each point cloud.

Thereafter, as shown in FIG. 16(B), the data generation device may form an external surface by meshing the modeled object.

Figure 17:
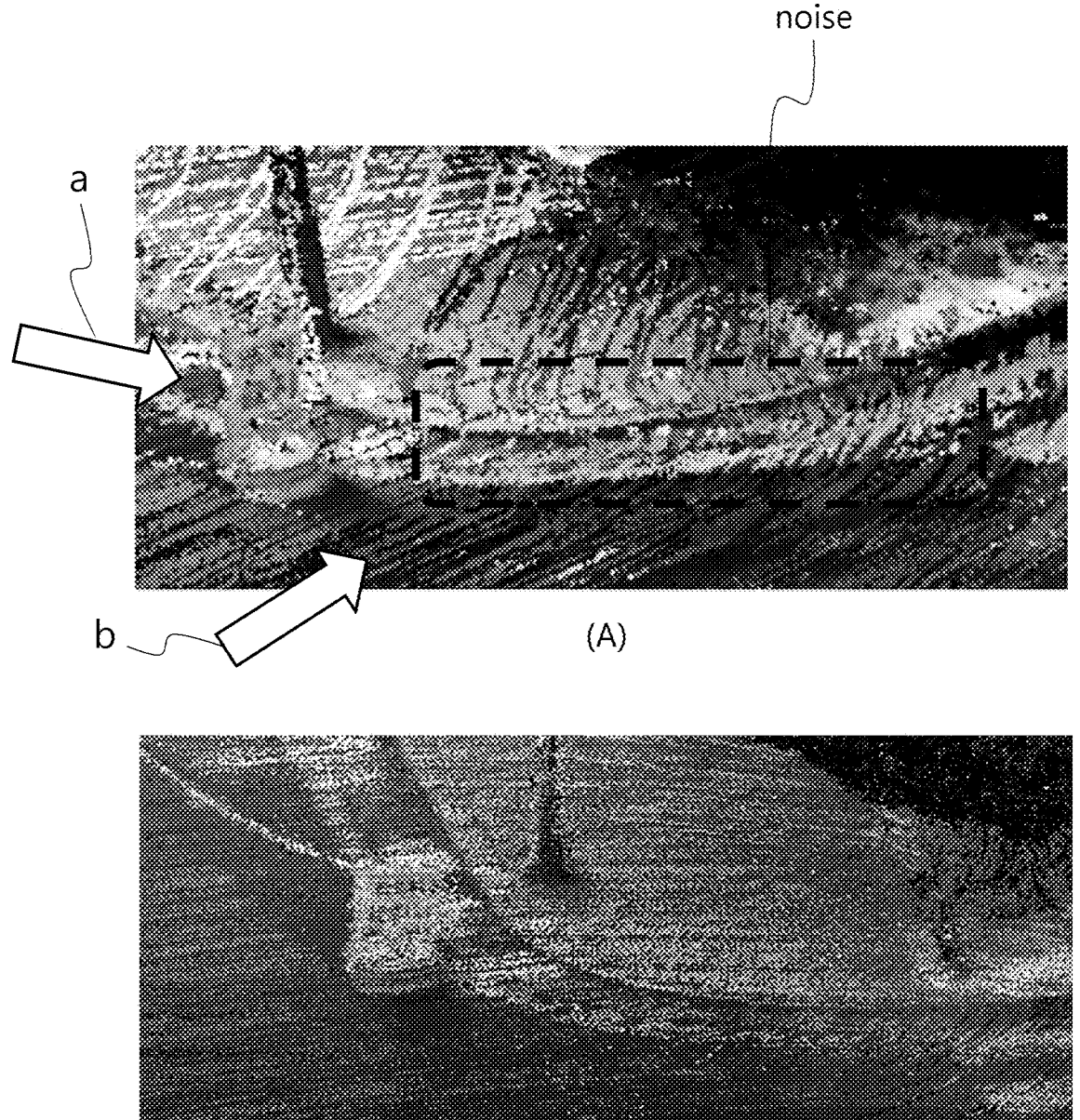
FIGS. 17 and 18 are exemplary views for explaining a color map generation method based on projection according to an embodiment of the present invention.
Figure 18:
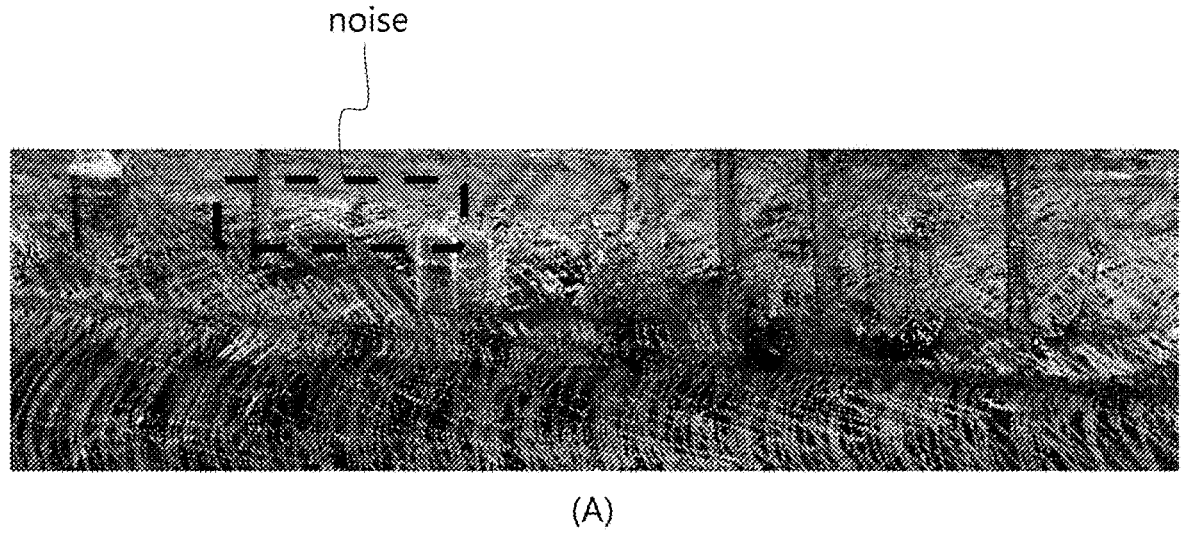
Figure 18:
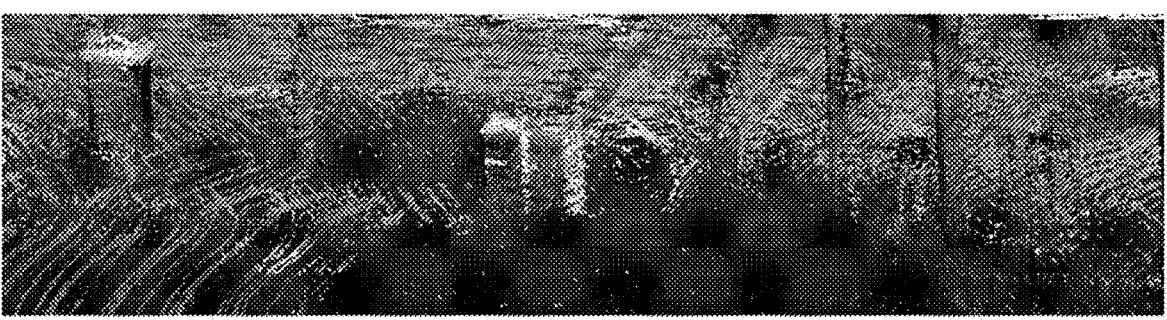

FIGS. 17 and 18 are exemplary views for explaining a color map generation method based on projection according to an embodiment of the present invention.

As shown in FIG. 17(A), the point cloud data detected by a laser pulse emitted in direction 'a' generates an area hidden by a part of the road due to the 'No Parking' sign. However, the point cloud data detected by a laser pulse emitted in direction 'b' includes point cloud data of the area hidden in the direction 'a'.

Accordingly, when the point cloud data collected in directions 'a' and 'b' are projected onto an image captured in direction 'a' by the camera, a noise of assigning the color of the 'No Parking' sign to the area hidden by the 'No Parking' sign is generated.

Accordingly, in the present invention, noise applied with a wrong color of the image may be effectively removed from an area recognized on the point cloud data although it is expressed as being hidden by a specific object on the image as shown in FIG. 17(B) by projecting the point cloud data on the image, filtering the point cloud data projected on the image based on the distance, and generating a color map.

In addition, as shown in FIG. 18(A), it can be confirmed that a noise is generated by an area hidden on the image behind the trash can. However, when filtering according to an embodiment of the present invention is applied, it can be confirmed that the noise in the hidden area is removed as shown in FIG. 18(B).

Figure 19:
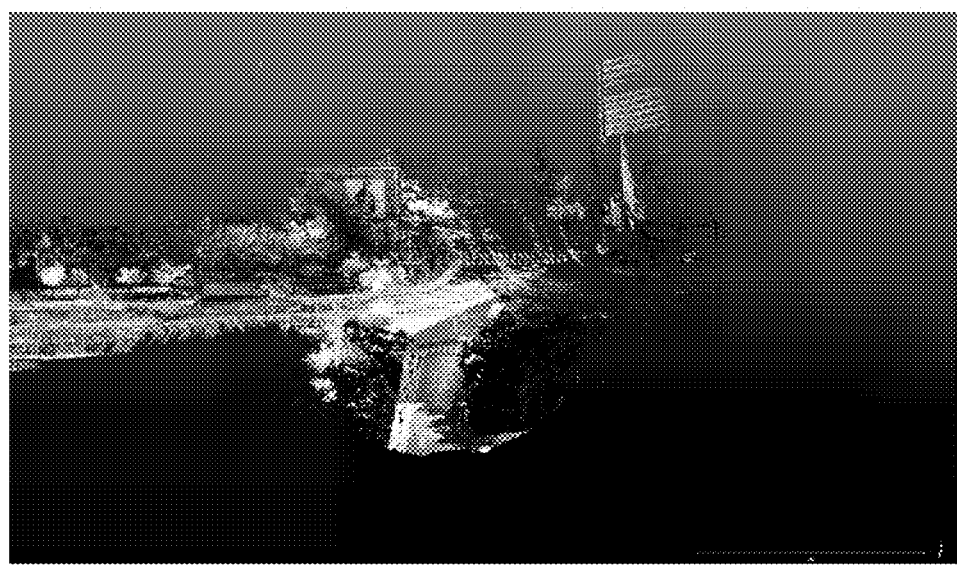
FIGS. 19 to 24 are exemplary views for explaining a color map generation method to which color correction is applied according to an embodiment of the present invention.
Figure 19:
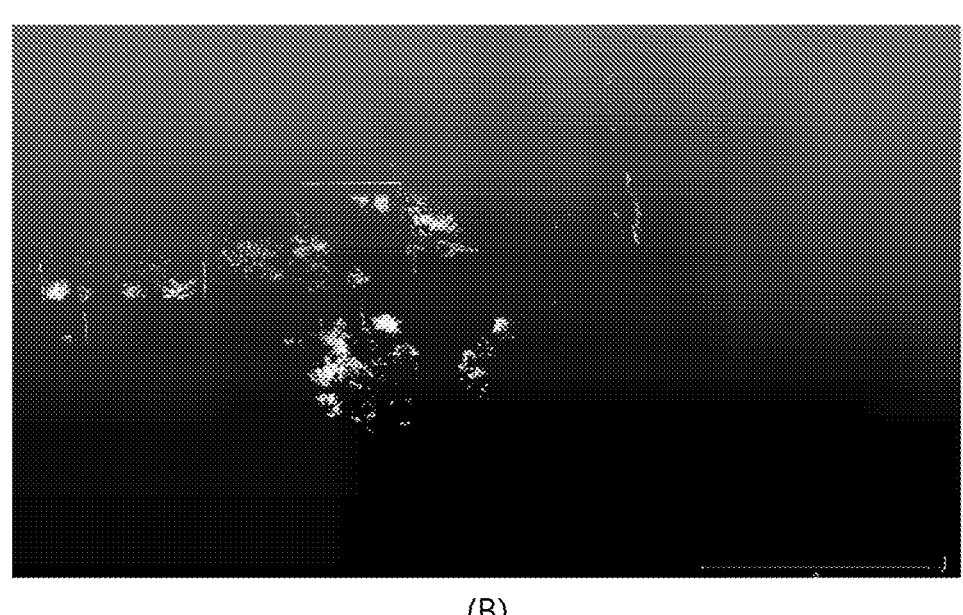
Figure 20:
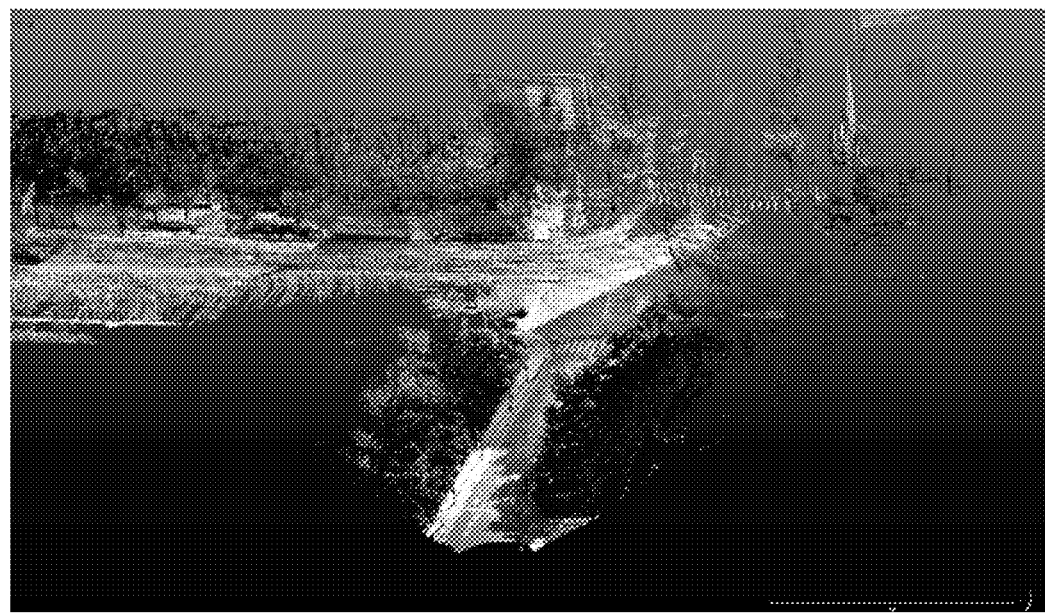

FIGS. 19 and 20 are exemplary views for explaining a color map generation method to which color correction is applied according to an embodiment of the present invention.

In addition, as the color map generation method to which color correction is applied according to an embodiment of the present invention separates points having a preset color from the point cloud data assigned with the color of the image, and generates a color map by correcting the color of the separated points based on the colors of neighboring points, noise generated as a bright color is applied to an object having a specific dark color due to the color of the sky or reflection of light can be removed effectively.

That is, as shown in FIG. 19, noise points due to the color of the sky or reflection of light can be detected as shown in FIG. 19 by separating points (B) having a preset color from point cloud data (A) to which the color of the image is assigned.

In addition, the map generation device may generate a color map as shown in FIG. by detecting a point closest to the detected noise points using an octree algorithm and correcting the noise points with the color of the closest point.

Meanwhile, FIG. 21(A) is a view showing a color map before applying a color map generation method to which color correction is applied according to an embodiment of the present invention, and FIG. 21(B) is a view showing a color map after applying the method.

Figure 21:
Figure 21:

As shown in FIG. 21, when noise points due to the color of the sky or reflection of light are separated, there is a problem in that the color of the points of the traffic facilities in blue color are also changed.

Accordingly, the map generation device may exclude the points having an intensity value higher than a preset value among the detected noise points from the noise points by utilizing that the intensity value of the traffic facilities is relatively high.

Figure 22:
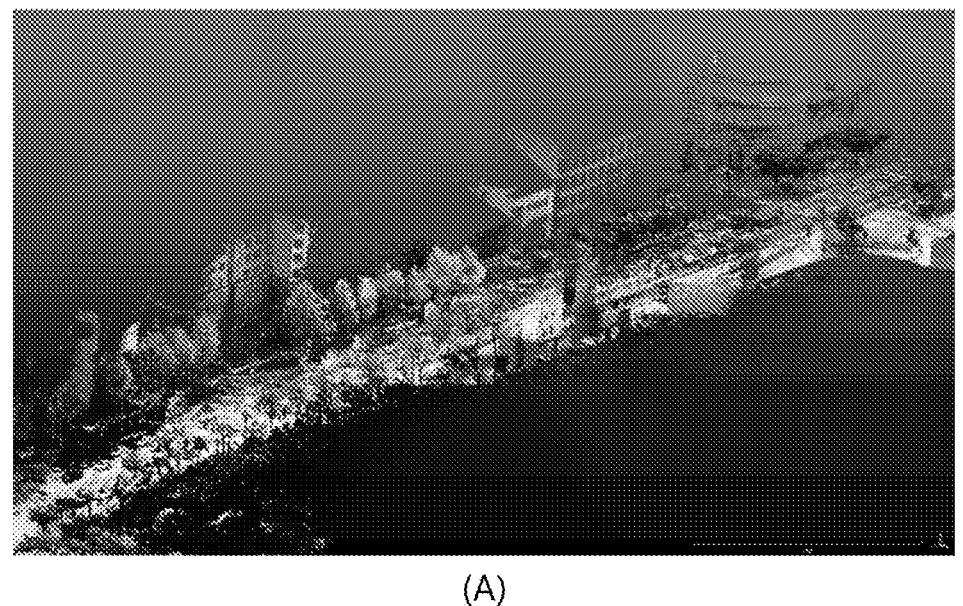
Figure 22:
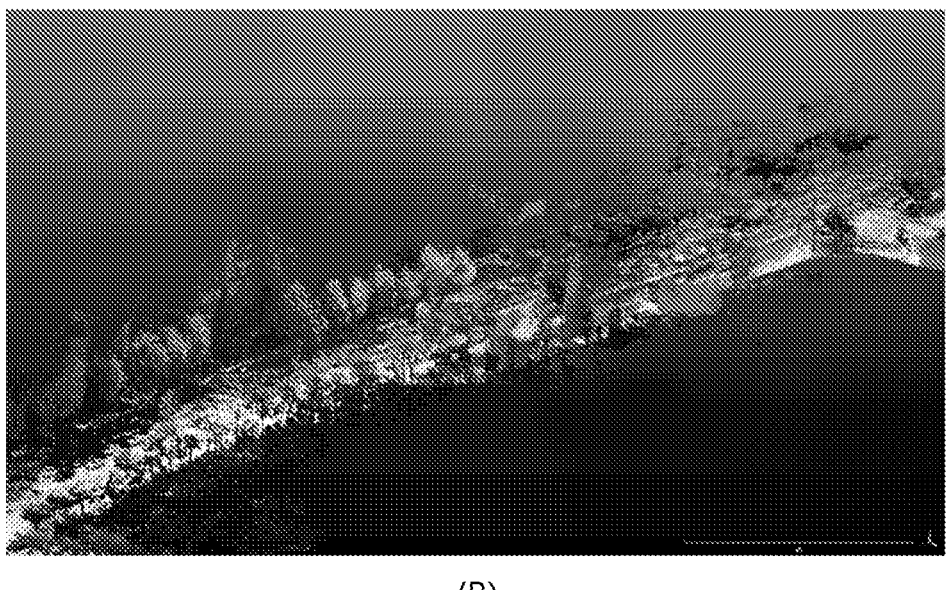

Referring to FIG. 22, in order to confirm the effect according to the present invention, as a result of generating a color map for a specific distance, it can be confirmed that noise points are effectively corrected after filtering (B) in comparison with the color map before the filtering (A).

Figure 23:
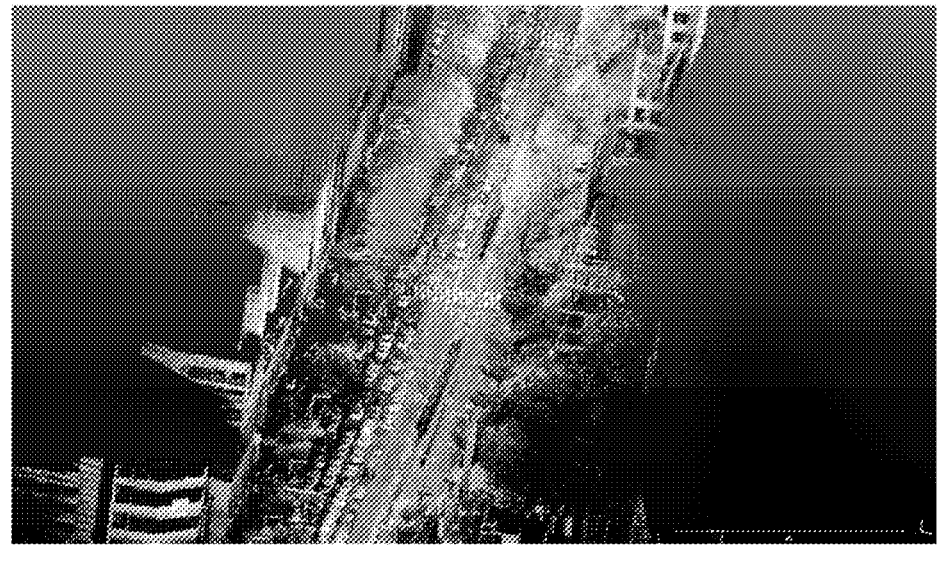
Figure 23:
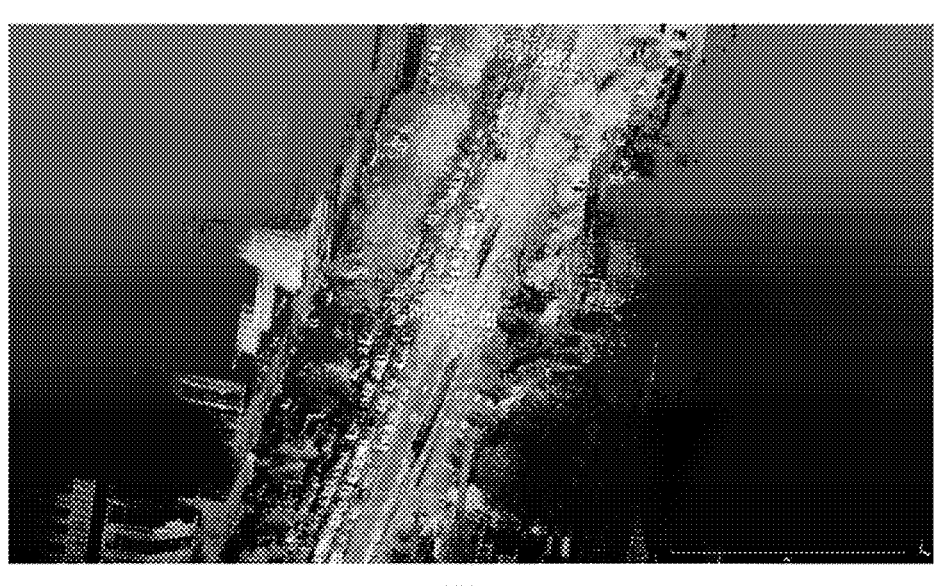

Referring to FIG. 23, as a result of generating a color map for a specific distance in case of rain, it can be additionally confirmed that noise points are effectively corrected after filtering (B) in comparison with the color map before the filtering (A).

Figure 24:
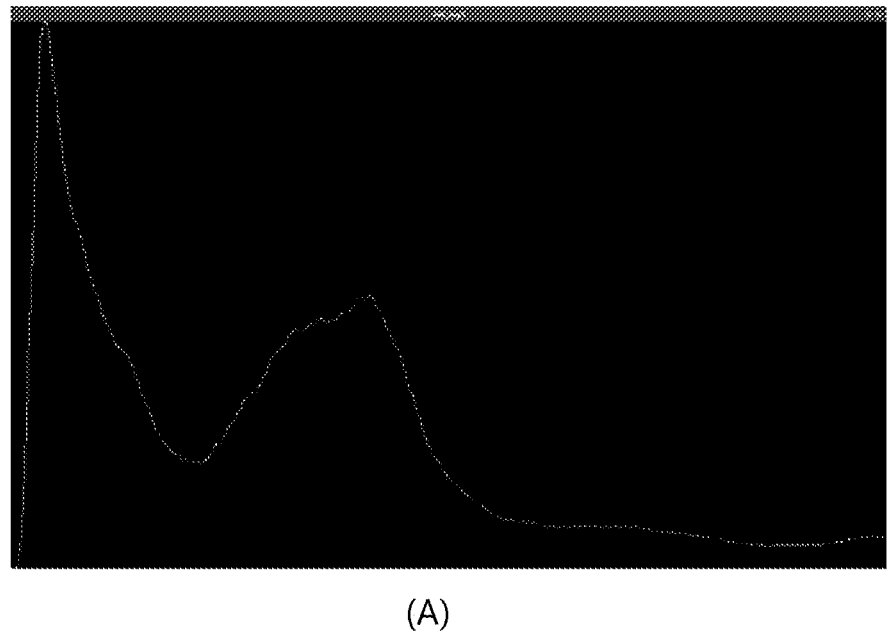
Figure 24:
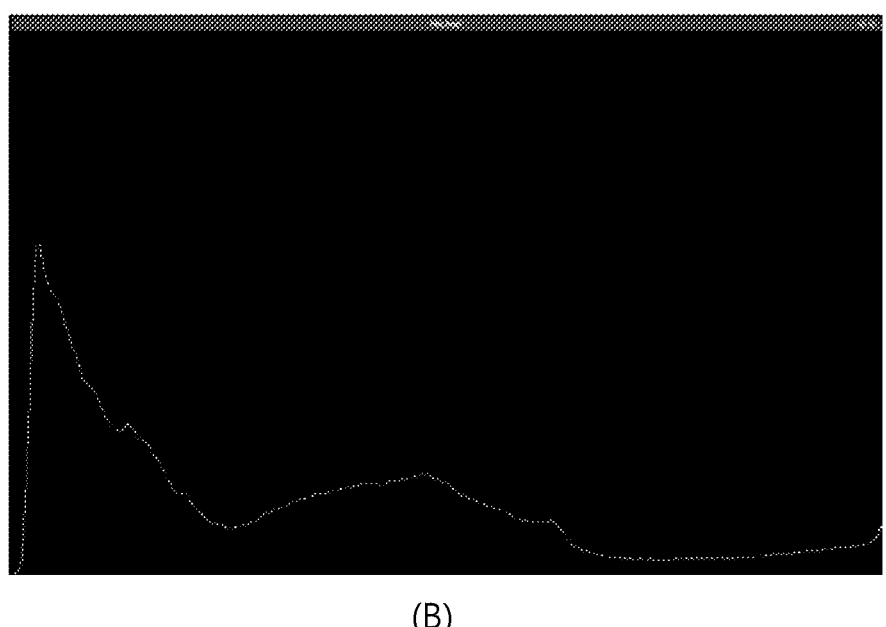

In addition, referring to FIG. 24, as a result of confirming distribution of brightness through a histogram for the first frame of the image with respect to each distance shown in FIGS. 22 and 23, it can be confirmed that pixels with bright values are similarly distributed on bright days and rainy days.

As described above, although preferred embodiments of the present invention have been disclosed in the specification and drawings, it is apparent to those skilled in the art that other modified examples based on the technical spirit of the present invention can be implemented in addition to the embodiments disclosed herein. In addition, although specific terms are used in the specification and drawings, they are only used in a general sense to easily explain the technical contents of the present invention and help understanding of the present invention, and are not intended to limit the scope of the present invention. Accordingly, the detailed description described above should not be interpreted as limiting in all respects and should be interpreted illustrative. The scope of the present invention should be selected by reasonable interpretation of the appended claims, and all changes within the equivalent scope of the present invention are included in the scope of the present invention.

DESCRIPTION OF SYMBOLS

| | |
|---|---|
| 100: Data collection device | 200: Data generation device |
| 300: Data generation system | |
| 205: Communication unit | 210: Input/output unit |
| 215: Storage unit | 220: Data collection unit |
| 225: Map generation unit | 230: Learning data generation unit |

What is claimed is:

1. A method of generating learning data for traffic facilities, the method comprising:

collecting, by a learning data generation unit, traffic facility sample images;

generating, by the learning data generation unit, at least one processed image by processing the collected traffic facility sample images, wherein the at least one processed image is similar to images captured by a camera installed in a vehicle; and generating, by the learning data generation unit, learning data by inserting a background into the generated at least one processed image, wherein the background is a random area on a plurality of 2D images collected through the camera mounted on the vehicle, and wherein the generating learning data is performed by randomly applying a size and a position of the at least one processed image to the background.

2. The method according to claim 1, wherein the step of generating at least one processed image includes generating a plurality of first processed images by applying shearing to the collected traffic facility sample images within a specific angular range.

3. The method according to claim 2, wherein the step of generating at least one processed image includes applying shearing to the collected traffic facility sample images with a random value between $-10$ and $10°$.

4. The method according to claim 3, wherein the step of generating at least one processed image includes generating a second processed image by applying Gaussian blur to one of the plurality of first processed images.

5. The method according to claim 4, wherein the step of generating at least one processed image includes randomly applying Gaussian blur to the plurality of first processed images within a radius value for a preset pixel.

6. The method according to claim 5, wherein the step of generating at least one processed image includes generating a plurality of third processed images by applying an intensity value to the second processed image.

7. The method according to claim 6, wherein the step of generating at least one processed image includes randomly applying an intensity value to the second processed image within a preset range of intensity value.

8. A non-transitory computer readable medium storing instructions that, when executed by at least one processor, cause the at least one processor to perform a method comprising:

collecting, by the at least one processor, traffic facility sample images stored in advance;

generating, by the at least one processor, at least one processed image by processing the collected traffic facility sample images, wherein the at least one processed image is similar to images captured by a camera installed in a vehicle; and generating, by the at least one processor, learning data by inserting a background into the generated at least one processed image, wherein the background is a random area on a plurality of 2D images collected through the camera mounted on the vehicle, and wherein the generating learning data is performed by randomly applying a size and a position of the at least one processed image to the background.

\* \* \* \* \*